US012579508B2

(12) United States Patent
Mirza et al.

(10) Patent No.: US 12,579,508 B2
(45) Date of Patent: Mar. 17, 2026

(54) SYSTEM AND METHOD FOR ELECTRONICALLY DETERMINING CORRECT PRODUCT PLACEMENT OF ITEMS

(71) Applicant: 7-Eleven, Inc., Irving, TX (US)

(72) Inventors: Shahmeer Ali Mirza, Celina, TX (US); Matthew O'Daniel Redmond, Denton, TX (US)

(73) Assignee: 7-Eleven, Inc., Irving, TX (US)

( * ) Notice: Subject to any disclaimer, the term of this patent is extended or adjusted under 35 U.S.C. 154(b) by 341 days.

(21) Appl. No.: 18/170,772

(22) Filed: Feb. 17, 2023

(65) Prior Publication Data

US 2024/0281756 A1      Aug. 22, 2024

(51) Int. Cl.
*G06Q 10/087* (2023.01)

(52) U.S. Cl.
CPC .................................. *G06Q 10/087* (2013.01)

(58) Field of Classification Search
CPC ........... G06Q 10/06375; G06Q 10/087; G06Q 30/06; G06Q 50/10; G06F 9/542; G06F 16/2246; G06F 16/2379
USPC .................................. 705/7.41, 7.38, 22, 28
See application file for complete search history.

(56) References Cited

U.S. PATENT DOCUMENTS

| | | | | |
|---|---|---|---|---|
| 8,429,004 | B2 * | 4/2013 | Hamilton ............... | G06Q 10/06 |
| | | | | 705/7.41 |
| 10,552,791 | B2 * | 2/2020 | Brooks ................ | G06Q 10/087 |
| 11,093,896 | B2 * | 8/2021 | Perrella ............... | G06F 16/2246 |
| 11,100,302 | B2 * | 8/2021 | Bonner ................... | G06F 9/542 |
| 2006/0031148 | A1 * | 2/2006 | O'Dell .............. | G06Q 30/0621 |
| | | | | 705/28 |
| 2016/0316938 | A1 * | 11/2016 | Cruttenden ............. | A47F 1/125 |
| 2018/0002109 | A1 * | 1/2018 | Yamashita ............. | G06V 10/17 |
| 2018/0114184 | A1 * | 4/2018 | Brooks ................. | G01G 23/18 |
| 2018/0189015 | A1 * | 7/2018 | Mattingly ........... | G06F 16/2379 |
| 2019/0095855 | A1 * | 3/2019 | Jones ................... | G06Q 10/087 |
| 2020/0050813 | A1 * | 2/2020 | Bonner ................... | G06F 9/542 |
| 2021/0117911 | A1 * | 4/2021 | Chanduri .............. | H04W 4/029 |
| 2021/0374463 | A1 * | 12/2021 | Bronicki .................. | G06T 7/80 |
| 2022/0270027 | A1 * | 8/2022 | Woods .................. | G06F 16/444 |
| 2022/0318731 | A1 * | 10/2022 | Vaught .............. | G06K 7/10366 |
| 2023/0079388 | A1 * | 3/2023 | Fisher ....................... | G06T 3/60 |
| | | | | 382/103 |
| 2023/0385757 | A1 * | 11/2023 | Uchimura .............. | G06Q 50/10 |
| 2023/0394428 | A1 * | 12/2023 | Itou ........................ | G06V 20/20 |
| 2023/0394429 | A1 * | 12/2023 | Itou ........................ | G06V 20/52 |

(Continued)

*Primary Examiner* — Olusegun Goyea
(74) *Attorney, Agent, or Firm* — Baker Botts L.L.P.

(57)      ABSTRACT

A system includes a plurality of racks each storing packs of cigarettes, a display device associated with each rack and a master controller coupled to the racks and the display devices. A processor of the master controller is configured to receive a first indication that a scanner has scanned a first code associated with a first rack of the plurality of racks while the scanner is in a product checking mode. In response, the processor obtains from a memory a first rack number of the first rack and a first UPC associated with the rack number based on a planogram. The processor subsequently receives a second UPC scanned by the scanner of a pack actually stored in the first rack. Based on determining that the first and second UPCs do not match, the processor transmits an alert message indicating incorrect product placement in the first rack.

17 Claims, 10 Drawing Sheets

(56)                    References Cited

U.S. PATENT DOCUMENTS

| | | | |
|---|---|---|---|
| 2023/0394430 A1* | 12/2023 | Itou ........................ | B65G 1/137 |
| 2024/0281870 A1* | 8/2024 | Adato .................. | G06Q 20/203 |

* cited by examiner

400

600 ⤳

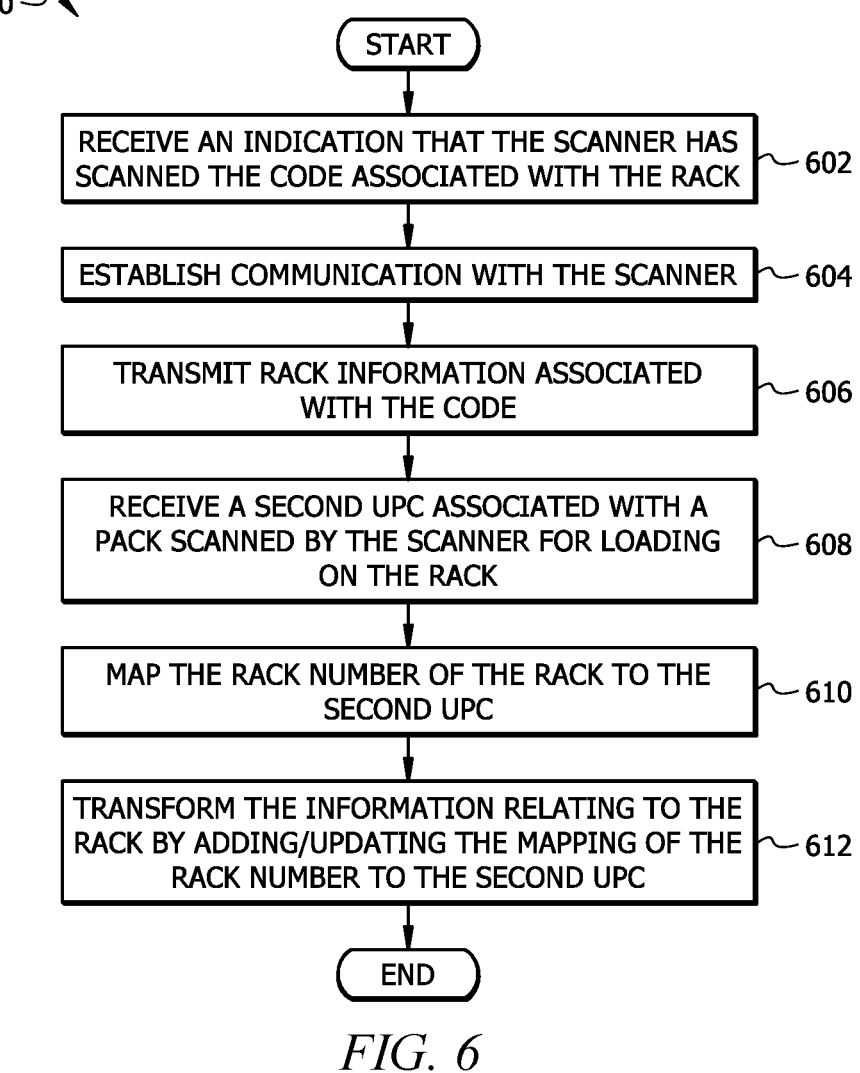

START

RECEIVE AN INDICATION THAT THE SCANNER HAS SCANNED THE CODE ASSOCIATED WITH THE RACK ⟋ 602

ESTABLISH COMMUNICATION WITH THE SCANNER ⟋ 604

TRANSMIT RACK INFORMATION ASSOCIATED WITH THE CODE ⟋ 606

RECEIVE A SECOND UPC ASSOCIATED WITH A PACK SCANNED BY THE SCANNER FOR LOADING ON THE RACK ⟋ 608

MAP THE RACK NUMBER OF THE RACK TO THE SECOND UPC ⟋ 610

TRANSFORM THE INFORMATION RELATING TO THE RACK BY ADDING/UPDATING THE MAPPING OF THE RACK NUMBER TO THE SECOND UPC ⟋ 612

END

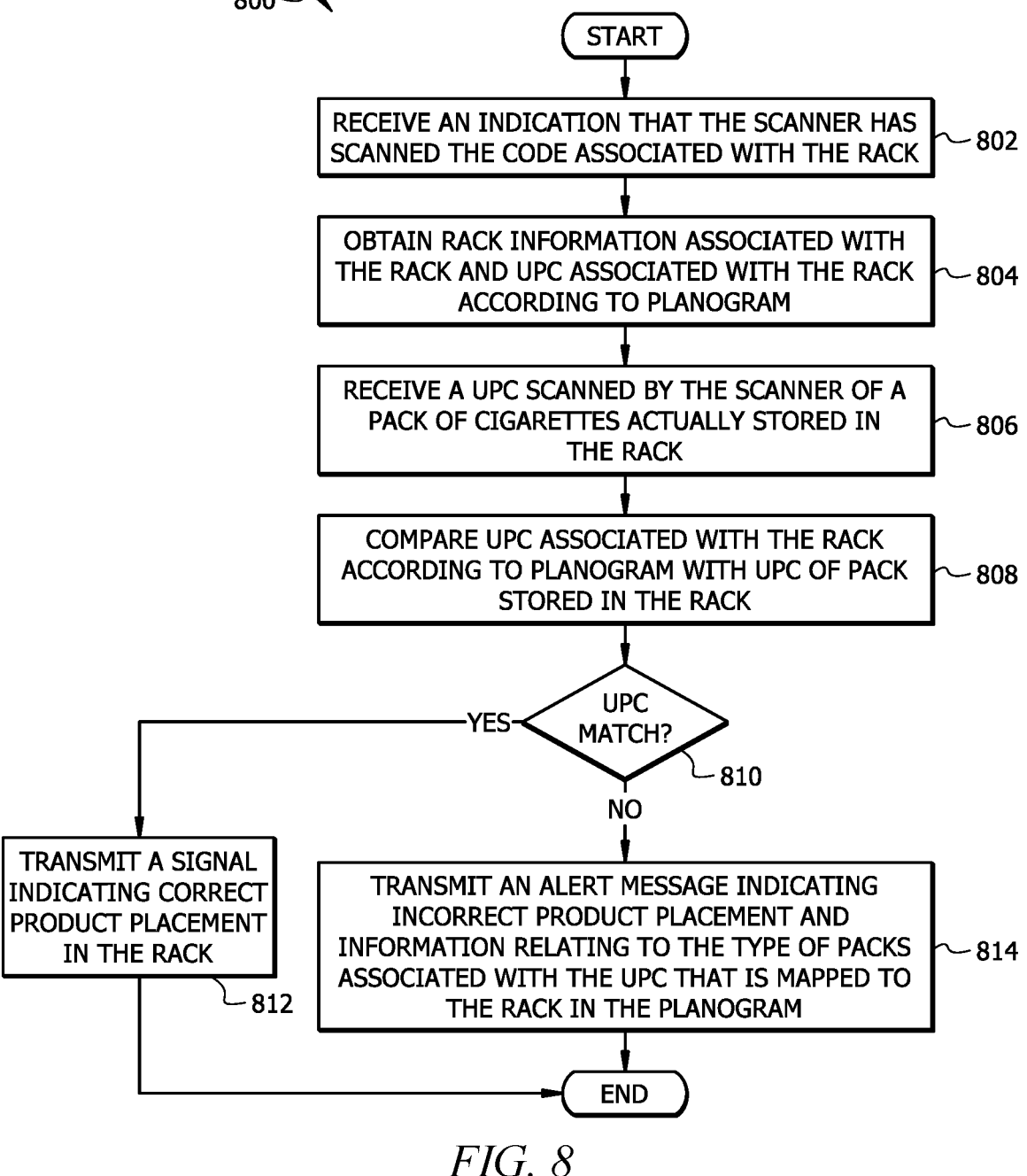

START

RECEIVE AN INDICATION THAT THE SCANNER HAS SCANNED THE CODE ASSOCIATED WITH THE RACK — 802

OBTAIN RACK INFORMATION ASSOCIATED WITH THE RACK AND UPC ASSOCIATED WITH THE RACK ACCORDING TO PLANOGRAM — 804

RECEIVE A UPC SCANNED BY THE SCANNER OF A PACK OF CIGARETTES ACTUALLY STORED IN THE RACK — 806

COMPARE UPC ASSOCIATED WITH THE RACK ACCORDING TO PLANOGRAM WITH UPC OF PACK STORED IN THE RACK — 808

UPC MATCH? — 810

YES

NO

TRANSMIT A SIGNAL INDICATING CORRECT PRODUCT PLACEMENT IN THE RACK — 812

TRANSMIT AN ALERT MESSAGE INDICATING INCORRECT PRODUCT PLACEMENT AND INFORMATION RELATING TO THE TYPE OF PACKS ASSOCIATED WITH THE UPC THAT IS MAPPED TO THE RACK IN THE PLANOGRAM — 814

END

FIG. 8

SYSTEM AND METHOD FOR ELECTRONICALLY DETERMINING CORRECT PRODUCT PLACEMENT OF ITEMS

TECHNICAL FIELD

The present disclosure relates generally to data processing, and more specifically to a system and method for electronically determining correct product placement of items.

BACKGROUND

Managing inventory on store shelves is an arduous and inefficient task. Inaccurate data regarding a type of product stored on store shelves and how much product is remaining on store shelves often leads to underutilization of shelf space. Incorrect product placement on store shelves may cause lower visibility and turnover of a product. Present inventory tracking procedures are labor intensive, time-consuming and vulnerable to errors. Efficient and accurate tracking of product on store shelves is needed.

SUMMARY

Presently, the conventional way to track inventory on store racks/shelves including determining a type and quantity/number of an item (e.g., packs of cigarettes) stored in a shelf/rack is to manually inspect the rack and count the number of items stored on the rack. For example, to know a type of cigarette packs stored in a rack and/or a number of the cigarette packs stored in the cigarette rack, a store clerk will need to walk up to the rack, open the rack, and manually determine a type of packs stored in the rack and count a number of the packs stored in the rack. A typical store has many such racks arranged across several shelves. Thus, keeping track of items stored across several racks/shelves becomes labor intensive and inefficient. Further, the present method for tracking inventory on store shelves is prone to human errors. Additionally, incorrect and/or infrequent inspection and recording of the quantity of a product may lead to underutilization of shelf space and may further result in inaccurate inventory tracking and replenishment. Further, stores are often required to follow a pre-determined planogram for product placement on racks and shelves. At the store level, employees and management tend to have a difficult time maintaining high levels of planogram conformance. Planogram conformance generally requires close and continuous observation by way of retail audits which are time consuming and expensive. Retail audits for checking planogram conformance are inefficient, labor intensive and prone to human errors. Thus, conventional techniques are flawed at least partly because they rely on human operation.

The system and methods implemented by the system as disclosed in the present disclosure provide technical solutions to the technical problems discussed above by implementing technology to effectively and efficiently manage inventory on store shelves and maintain high levels of planogram conformance. The disclosed system and method provide several practical applications and technical advantages. For example, the disclosed system provides the practical application of electronically mapping a rack to a type of item stored in the rack. For example, embodiments of the present disclosure provide a system that includes an intelligent rack that stores a plurality of packs of cigarettes, wherein the intelligent rack includes a circuit board having a memory, a processor and a network interface. The memory stores information relating to the rack including, but not limited to, a rack number of the rack, a number of packs stored in the rack and a universal product code (UPC) associated with a type of the packs stored in the rack. In certain embodiments, the intelligent rack may be configured to count a number of packs of cigarettes currently stored in the rack. The system further includes a display device associated with the rack and positioned in front of the rack, wherein the display devices displays a code associated with the information relating to the rack. The processor is configured to receive using the network interface, an indication that a scanner has scanned the code associated with the rack. In response to receiving the indication, the processor establishes communication with the scanner using the network interface and transmits to the scanner at least a portion of the information relating to the rack. The processor receives from the scanner a second UPC associated with a pack of cigarettes scanned by the scanner for loading into the rack and maps the rack number of the rack to the second UPC received from the scanner. The processor then transforms the information relating to the rack by adding to the information the second UPC mapped to the rack number, wherein the code is associated with the transformed information. The processor may transmit the transformed information relating to the rack to a master controller that is communicatively coupled to a plurality of such racks.

Electronically mapping a rack to a rack UPC helps efficient and precise inventory tracking. For example, at any time, the master controller precisely knows which rack is storing what product and in what amount. Thus, the disclosed system and method provide quick and precise information relating to product placement and amount of inventory relating to each product stored in racks. Accordingly, the disclosed system and method significantly improve the speed and accuracy of inventory tracking. Additionally, as the most recent information relating to a type and amount of product on each rack is readily available, the disclosed system and method significantly improve the efficiency and accuracy of tracking planogram adherence. For example, a quick comparison of the rack information stored in the memory of the master controller with the planogram may provide information relating to the particular racks that are in non-conformance to the planogram. For example, the system may provide the rack number of a particular rack that is currently storing the wrong product. Thus, the disclosed system and method significantly reduce the effort associated with tracking inventory and planogram conformance.

The disclosed system provides an additional practical application of electronic rack auditing by checking racks for incorrect product placement and planogram conformance. For example, embodiments of the present disclosure provide a system that includes a plurality of intelligent racks, wherein each rack stores a plurality of packs of cigarettes. The system further includes a plurality of display devices, wherein each display device is associated with a corresponding rack of the plurality of racks and is positioned in front of the corresponding rack. The system also includes a master controller communicatively coupled to the plurality of racks and the plurality of display devices. The master controller includes a network interface, a memory and a processor. The memory stores a planogram that comprises a plan for product placement of a plurality of types of the packs in the plurality of racks, wherein the planogram comprises a universal product code (UPC) associated with a rack number of each rack indicating a type of the packs to be stored in the rack. For each rack, memory also stores information relating to the rack (e.g., rack number, rack UPC, number of packs etc.) and a code associated with the rack information. The display device associated with each rack displays the code associated with the information relating to the rack. The processor is configured to receive using the network interface a first indication that a scanner has scanned a first code associated with a first rack of the plurality of racks while the scanner is in a product checking mode and in response to receiving the first indication, obtain from the memory a first rack number of the first rack, and a first UPC associated with the type of the packs expected to be stored in the first rack, wherein the first UPC associated with the first rack matches with the product placement specified for the first rack by the planogram. The processor then receives using the network interface from the scanner a second UPC scanned by the scanner, wherein the second UPC is associated with a pack of cigarettes actually stored in the first rack. The processor compares the first UPC with the second UPC and determines based on the comparison whether the second UPC matches with the first UPC. If the first UPC does not match with the second UPC, the processor transmits to the scanner an alert message indicating incorrect product placement in the first rack.

Thus, the disclosed system and method provide quick and precise rack auditing. For example, a quick scan of the code associated with a rack provides information relating to the rack almost instantly. This allows a user to quickly check whether a pack actually stored in the rack is of the type expected to be stored in the rack as per the rack information associated with the code. Further, the disclosed system and method provide a technique for determining and tracking a degree of conformance of a store to a pre-determined planogram. As described in embodiments of this disclosure, the master controller determines a confidence indicator based on checking product placement for a plurality of racks in a store. The confidence indicator allows an inventory planner to decide whether corrective measures need to be taken to improve planogram conformance. For example, when the confidence indicator determined for a particular store is below a threshold value, the inventory planner may determine that additional training needs to be provided to the store clerks to improve planogram conformance. Additionally, by providing information relating to the correct type of pack that is to be stored in a rack while loading product, the disclosed system and method avoid human errors associated with product loading and thus improve planogram conformance.

The disclosed system provides an additional practical application of electronic product layout correction to improve planogram conformance. As described in embodiments of the present disclosure, in response to detecting packs of cigarettes placed in an incorrect rack that is not in conformance to the planogram, the master controller transmits to the scanner information relating to a type of packs that can be stored in the rack in conformance with the planogram. Additionally or alternatively, the master controller may transmit to the scanner information (e.g., rack numbers) relating to one or more other racks that are designated to store the packs wrongly stored in the rack.

By intelligently detecting wrong product placement on racks during product checking and product loading, and in response, providing information relating to correct product placement in the racks that is in line with product placement specified by the planogram, the disclosed system and method allow efficient correction of product placement and improve planogram conformance.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a flowchart of an example method for associating a rack with a type of a pack of cigarettes to be stored in the rack, in accordance with certain embodiments of the present disclosure;

FIG. 8 is a flowchart of an example method for correcting product placement in a rack in conformance with a planogram, in accordance with certain embodiments of the present disclosure.

DETAILED DESCRIPTION

System Overview

Figure 1:
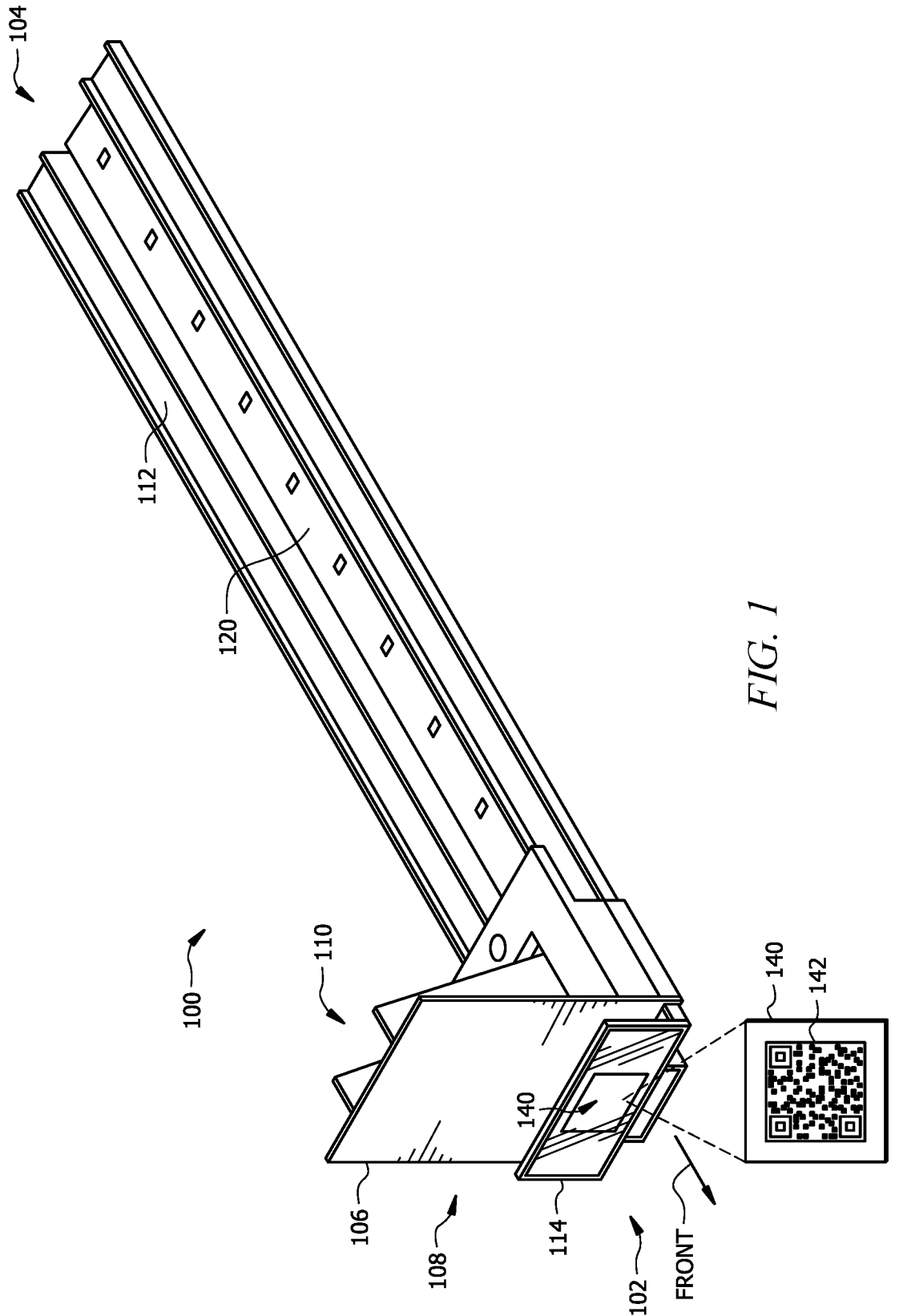
FIG. 1 illustrates an example rack that stores a plurality of packs of cigarettes, in accordance with certain embodiments of the present disclosure.

FIG. 1 illustrates an example rack 100 that stores a plurality of packs of cigarettes, in accordance with certain embodiments of the present disclosure. Although the present disclosure is described in detail with respect to packs of cigarettes, it also applies to other products that may be stored on a rack.

Figure 2A:
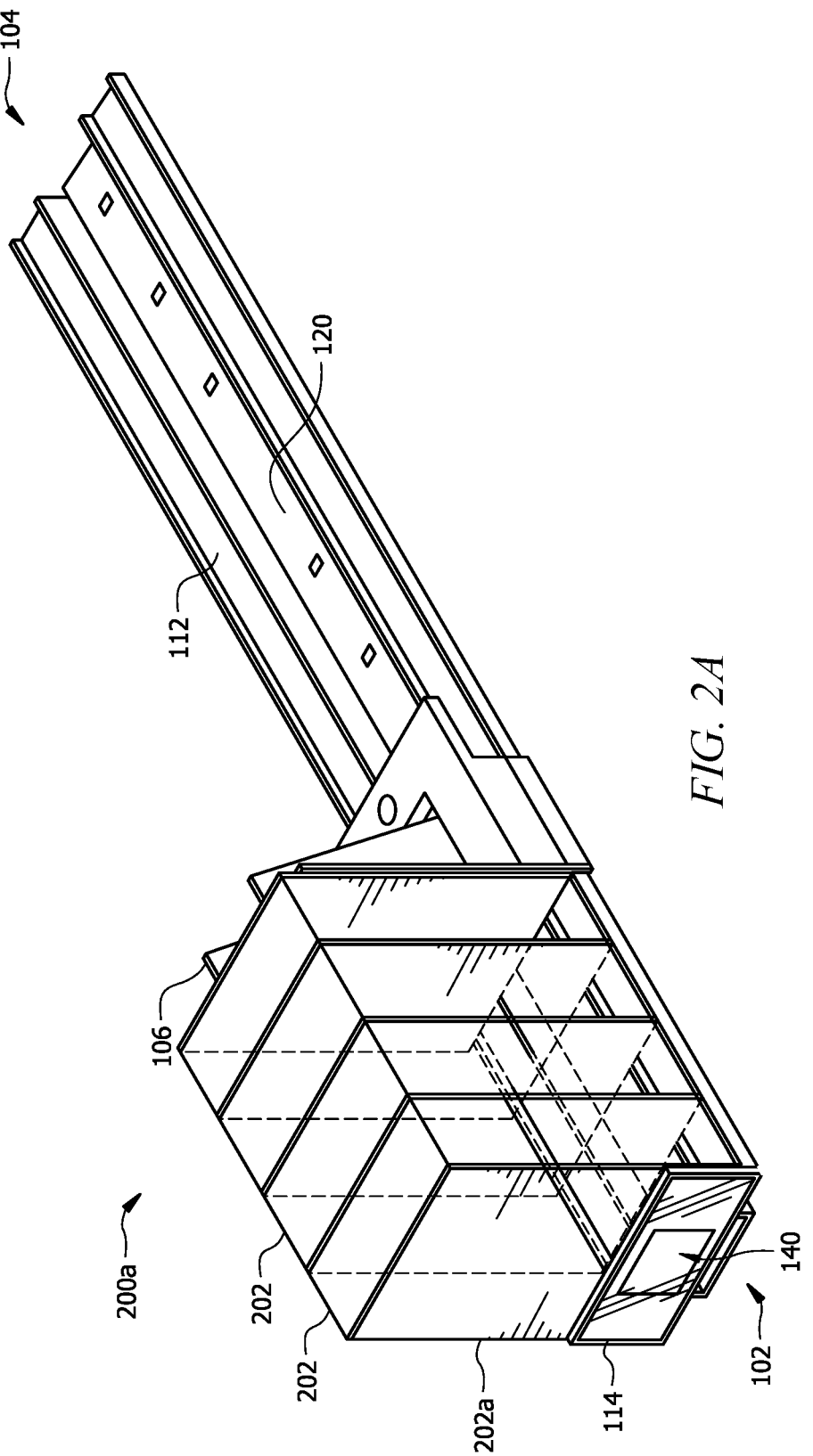
FIGS. 2A and 2B illustrate two different views of the rack storing a plurality of packs of cigarettes, in accordance with certain embodiments of the present disclosure.
Figure 2B:
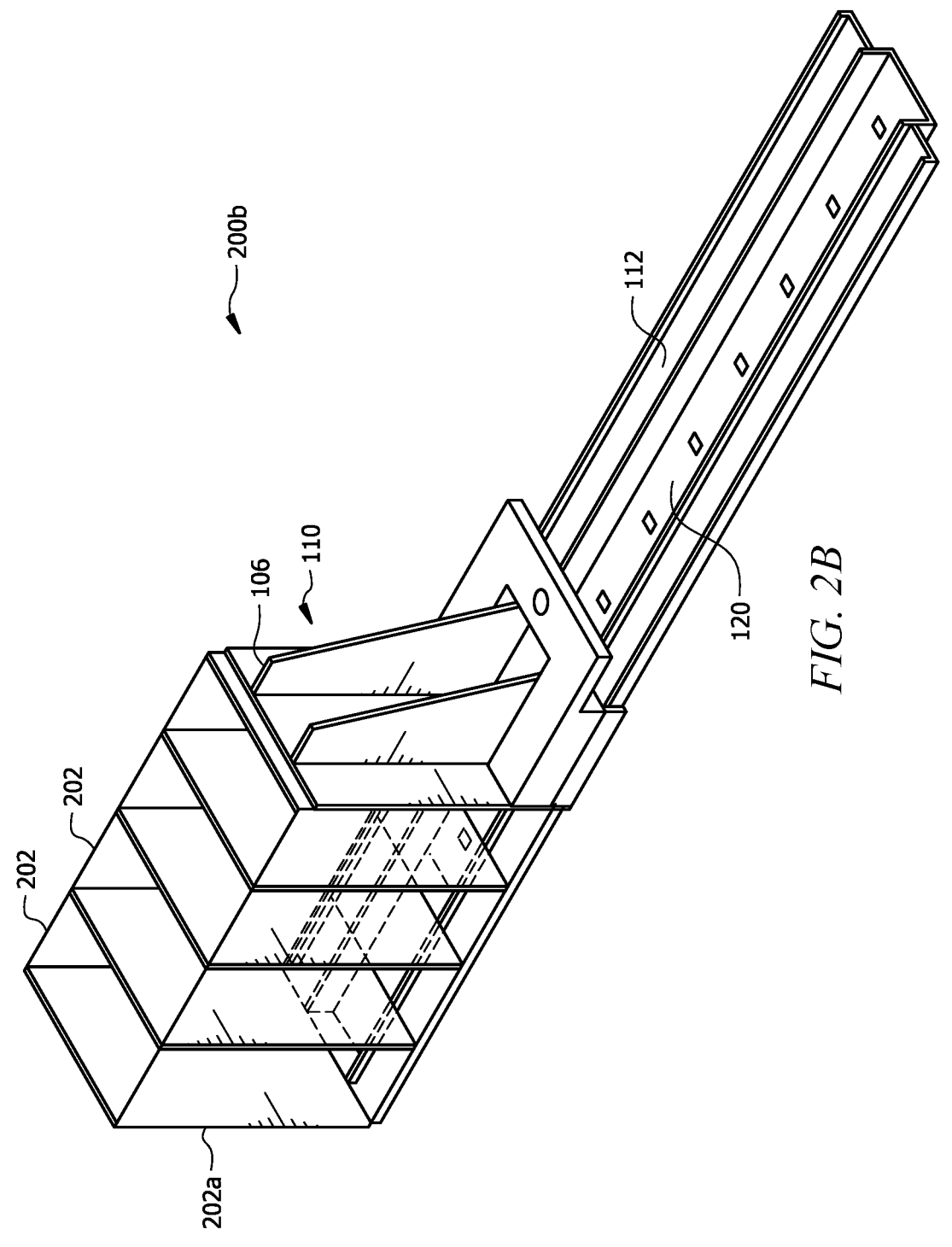

As shown in FIG. 1, rack 100 includes a longitudinal track 112 with a shoe 106 movably attached to the longitudinal track 112 such that the shoe travels back and forth on the track 112 between a front end 102 and a rear end 104 of the rack 100. The rack 100 is designed to store a plurality of packs 202 of cigarettes (as shown in FIGS. 2A and 2B) along the length of the rack 100 between the front end 102 and the rear end 104 of the rack 100. FIGS. 2A and 2B illustrate two different views 200a and 200b respectively of the rack 100 storing a plurality of packs 202 of cigarettes. As shown in FIGS. 2A and 2B, packs 202 of cigarettes are placed adjacent to a front end 108 of the shoe 106 (front end 108 of the shoe 106 as shown in FIG. 1) such that the shoe 106 is pushed back towards the rear end 104 of the rack 100 with each pack 202 loaded on to the rack 100. Generally, a mechanism (not shown) is coupled to the shoe 106 that drives the shoe 106 towards the front end 102 of the rack 100 causing a frontmost pack 202a stored in the rack 100 to press against a front wall 114 of the rack 100 near the front end 102 of the rack 100.

In some embodiments, this mechanism may include a coiled spring coupled to the shoe 106 that drives the shoe 106 towards the front end 102 of the rack 100. As shown in FIG. 1, the shoe 106 is positioned at the extreme front end 102 of the rack 100 adjacent to the front wall 114 when no packs 202 are stored in the rack 100. Referring to FIGS. 2A and 2B, as packs 202 of cigarettes are loaded on to the rack 100, the shoe 106 is pushed back on the track 112 along the length of the rack 100 towards the rear end 104 of the rack 100. Referring back to FIG. 1, rack 100 may further include a display device 140 positioned on the front wall 114 (e.g., attached to or built as part of the front wall 114). As discussed in further detail below, the display device 140 may be configured to display a code 142 (e.g., quick response (QR) code) associated with the rack 100. The code 142 is associated with information relating to the rack 100 including, but not limited to, a rack number of the rack 100, a universal product code (UPC) associated with a type of packs 202 stored in the rack 100, and a number of the packs 202 currently stored in the rack 100. While the display device 140 is shown as positioned on the front wall 144, it may be noted that the display device 140 may be positioned anywhere in the vicinity of the rack 100.

Figure 5:
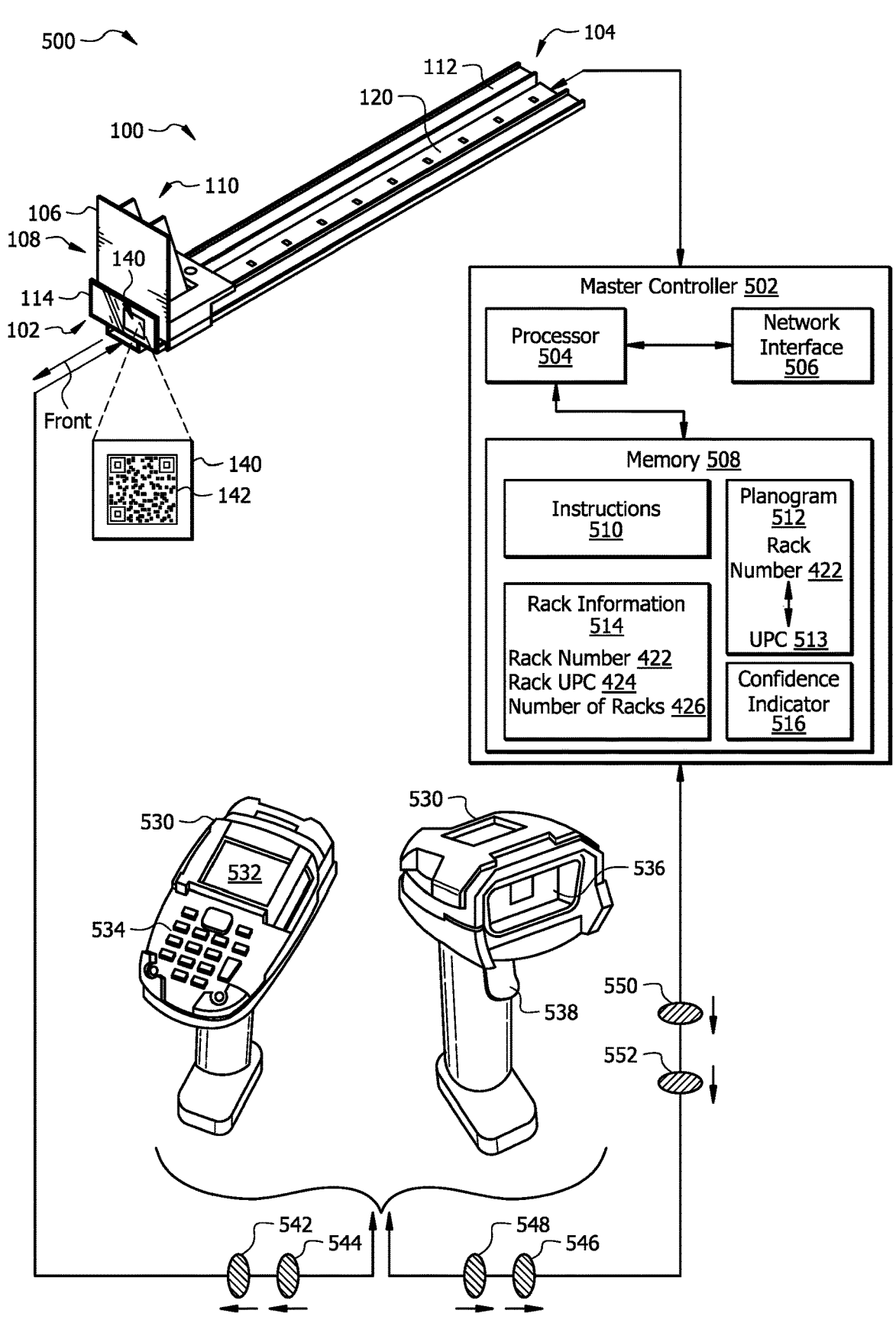
FIG. 5 illustrates a schematic diagram of an example system for inventory tracking and planogram adherence, in accordance with certain aspects of the present disclosure.

A typical store generally has a plurality of racks 100 arranged next to each other in one or more shelves, wherein different subsets of the racks 100 may store different types of packs 202 of cigarettes. Often product placement on racks in a store is decided based on a pre-determined planogram (e.g., planogram 512 as shown in FIG. 5) specifically designed for the particular store. The term "planogram" usually refers to a visual representation of the proper placement of all displays, merchandise and shelving used in a store. Planograms typically provide a visual representation of where a product is to be placed in the store and, in some embodiments, how the product should look on shelf. This guide helps merchandisers easily identify scarcity in stock, effectively manage inventory, maximize shelf space and optimize re-stocking. Effective planograms are developed with demographic and in-store data, which predicts customer behavior in-store. Planograms facilitate product layouts are conducive to browsing, merchandising is located in prime foot traffic areas, display fixtures and product identification are in the right location and more. Planogram compliance helps promote a positive customer experience which benefits both retailers and brands.

Figure 3:
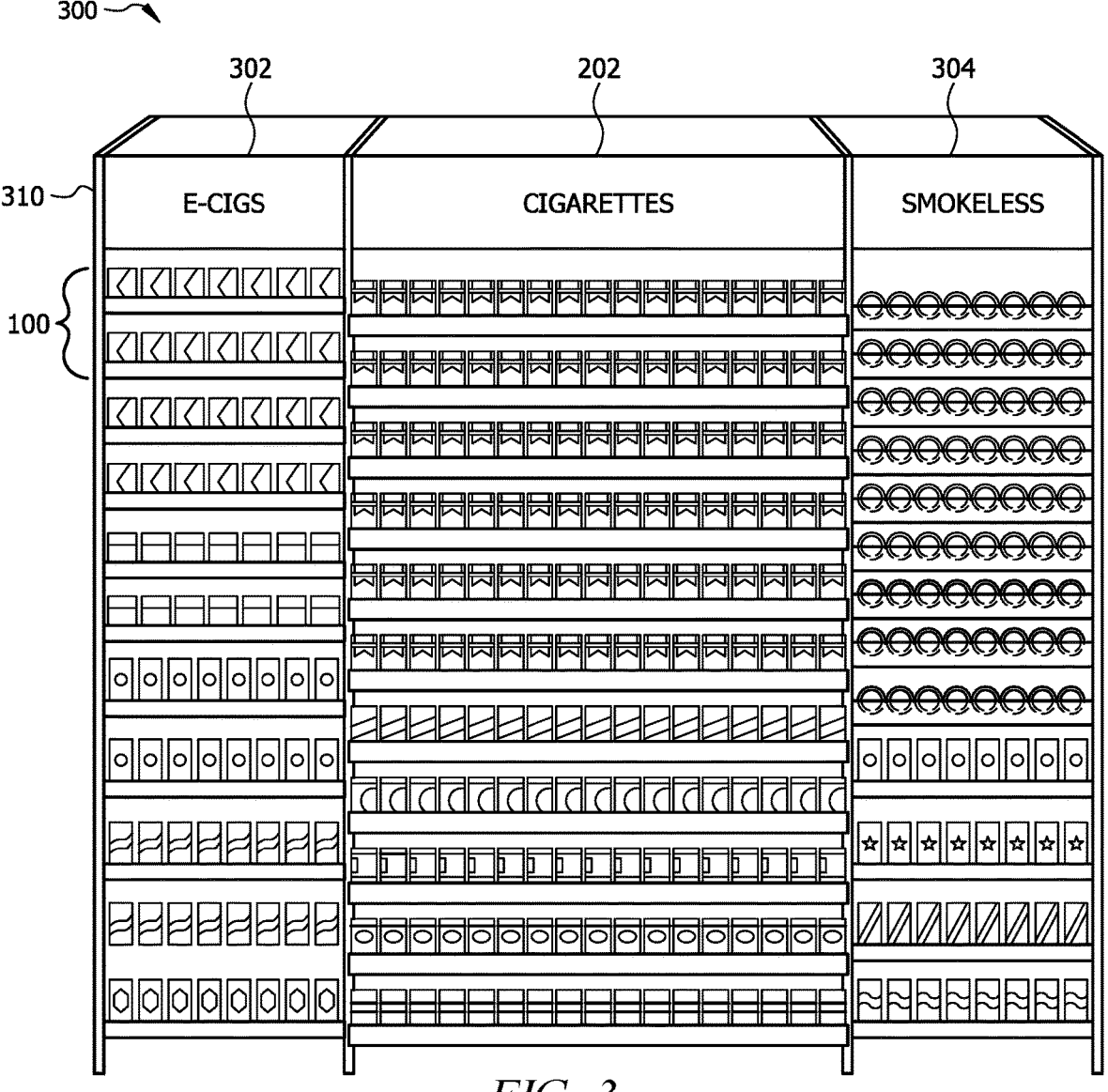
FIG. 3 illustrates an example product display showing placement of a plurality of types of products in a plurality of racks, in accordance certain embodiments of the present disclosure.

FIG. 3 illustrates an example product display 300 showing placement of a plurality of types of products in a plurality of racks 100, in accordance with certain embodiments of the present disclosure. As shown in FIG. 3, a plurality of types of cigarette packs 202, e-cigarettes 302 and smokeless products 304 are arranged in a plurality of racks 100 in a product display 310 typically used by stores to store and display similar types of product. The arrangement of the cigarette packs 202, e-cigarettes 302 and smokeless products 304 may be in accordance with a pre-determined planogram that decides which product is to be stored in which part of the display 310 and/or which particular rack 100 of the display 310. For example, the racks 100 included in the display 310 may be numbered such that each rack 100 of the display 310 is assigned a unique rack number. As illustrated and described in further detail in conjunction with FIG. 5, a planogram 512 may include a mapping of each type of product (e.g., cigarette packs 202, e-cigarettes 302 and smokeless products 304) to one or more rack numbers in the display.

At store level, employees and management tend to have a difficult time tracking inventory and maintaining high levels of planogram compliance. Planogram compliance generally involves close and continuous observation by way of retail audits which are time consuming and expensive. Retail audits for checking planogram conformance are tedious, labor intensive and prone to human errors.

Certain embodiments of the present disclosure disclose a system and methods implemented by the system for inventory tracking including tracking product placement in racks and planogram compliance intelligently and precisely.

Referring back to FIG. 1, rack 100 further includes a longitudinal circuit board 120 arranged along the length of the rack 100. As described in more detail below, circuit board 120 collects, tracks, stores and provides information relating to the rack 100 that includes an identity of the rack 100, a type of product currently stored in the rack 100 and an amount of the product stored in the rack 100.

Figure 4:
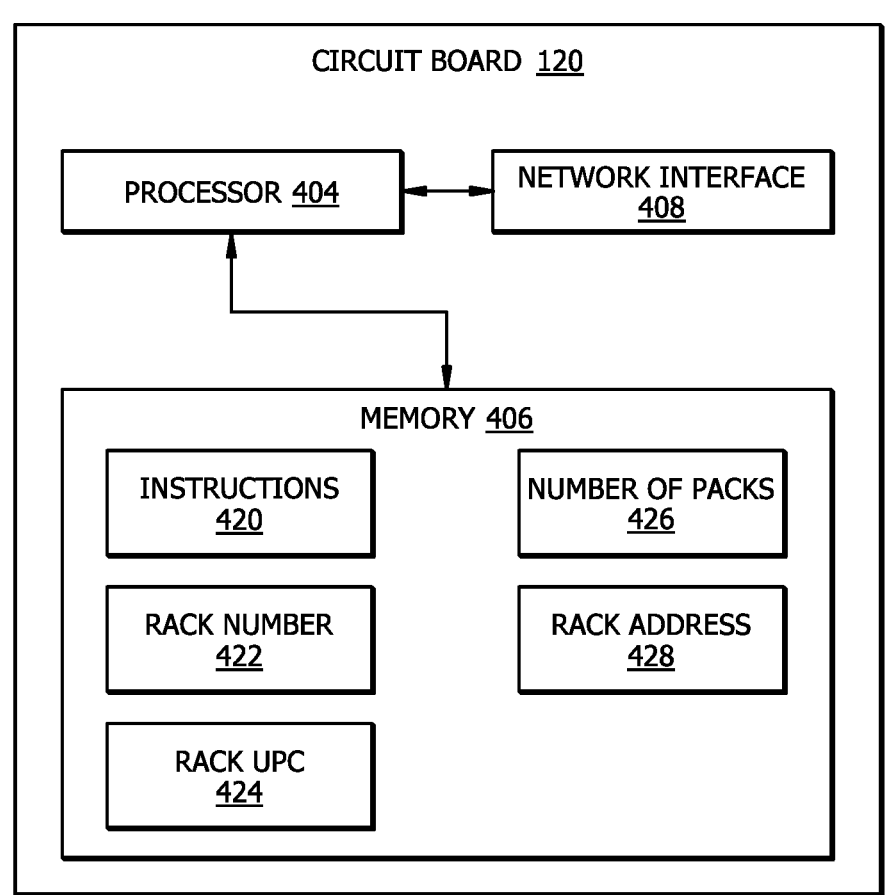
FIG. 4 illustrates a schematic diagram of a circuit board shown in FIG. 1, in accordance with certain embodiments of the present disclosure.

FIG. 4 illustrates a schematic diagram 400 of a circuit board 120 of FIG. 1, in accordance with certain embodiments of the present disclosure. As shown in FIG. 4, circuit board 120 includes a processor 404, a memory 406 and a network interface 408.

The processor 404 comprises one or more processors operably coupled to the memory 406. The processor 404 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 404 may be a programmable logic device, a microcontroller, a microprocessor, or any suitable combination of the preceding. The processor 404 is communicatively coupled to and in signal communication with the memory 406. The one or more processors 404 are configured to process data and may be implemented in hardware or software. For example, the processor 404 may be 8-bit, 16-bit, 32-bit, 64-bit or of any other suitable architecture. The processor 404 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 404 are configured to implement various instructions 420. For example, the one or more processors 404 are configured to execute instructions 420 to implement certain operations described in this disclosure. In this way, processor 404 may be a special-purpose computer designed to implement the functions disclosed herein. In one or more embodiments, functions of the processor 404 are implemented using logic units, FPGAs, ASICs, DSPs, or any other suitable hardware. The processor 404 is configured to operate as described with reference to FIGS. 1-9. For example, processor 404 may be configured to perform at least a portion of the methods 600, 700 and 800 as described in FIGS. 6, 7 and 8 respectively.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store, among other things, instructions 420 for implementing the functionality described herein. As described in further detail below, memory 406 may further store information relating to the rack including, but not limited to, a rack number 422 of the rack, a UPC associated with a type of product (e.g., packs 202 of cigarettes) currently mapped to the rack 100 (shown as rack UPC 424), and a number 426 of packs 202 (or an amount of any other product/item) currently stored in the rack 100. The instructions stored in the memory 406 may include any suitable set of instructions, logic, rules, or code operable to implement the functionality disclosed herein. The memory 406 may also store a rack address 428 associated with the rack 100 (e.g., a network address of the network interface 408 on the circuit board 120 of the rack 100).

The network interface 408 is configured to enable wired and/or wireless communications. The network interface 408 is configured to communicate data between the circuit board 120 and other devices, systems, or domains (e.g. a master controller, cloud infrastructure etc.). For example, the network interface 408 may comprise a Wi-Fi interface, a LAN interface, a WAN interface, a modem, a switch, or a router. The processor 404 is configured to send and receive data using the network interface 408. The network interface 408 may be configured to use any suitable type of communication protocol as would be appreciated by one of ordinary skill in the art.

In one embodiment, the processor 404 is configured to determine a number of packs 202 of cigarettes currently stored in the rack 100. A method of determining the number of packs 202 of cigarettes currently stored in the rack 100 is beyond the scope of this disclosure and will not be described herein.

FIG. 5 illustrates a schematic diagram of an example system 500 for inventory tracking and planogram adherence, in accordance with certain aspects of the present disclosure.

As shown in FIG. 5, system 500 includes a rack 100, a scanner 530, and a master controller 502 communicatively coupled to the rack 100 and the scanner 530. Master controller 502 includes a memory 508, a network interface 506 and a processor 504 communicatively coupled to the memory 508 and the network interface 506.

The processor 504 comprises one or more processors operably coupled to the memory 508. The processor 504 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 504 may be a programmable logic device, a microcontroller, a microprocessor, or any suitable combination of the preceding. The processor 504 is communicatively coupled to and in signal communication with the memory 508. The one or more processors 504 are configured to process data and may be implemented in hardware or software. For example, the processor 504 may be 8-bit, 16-bit, 32-bit, 64-bit or of any other suitable architecture. The processor 504 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 504 are configured to implement various instructions 510. For example, the one or more processors 504 are configured to execute instructions 510 to implement the master controller 502. In this way, processor 504 may be a special-purpose computer designed to implement the functions disclosed herein. In one or more embodiments, master controller 502 is implemented using logic units, FPGAs, ASICs, DSPs, or any other suitable hardware. Master controller 502 is configured to operate as described with reference to FIGS. 5-9. For example, master controller 502 may be configured to perform at least a portion of the methods 600, 700 and 800 as described in FIGS. 6, 7 and 8 respectively.

The memory 508 comprises one or more disks, tape drives, or solid-state drives, and may be used as an over-flow data storage device, to store programs when such programs are selected for execution, and to store instructions 510 and data that are read during program execution. The memory 508 may be volatile or non-volatile and may comprise a read-only memory (ROM), random-access memory (RAM), ternary content-addressable memory (TCAM), dynamic random-access memory (DRAM), and static random-access memory (SRAM).

The memory 508 is operable to store, among other things, rack information 514 associated with one or more racks 100, a planogram 512, a confidence indicator 516 indicating a degree of conformance to the planogram, and instructions 510 for implementing the functionality of the master controller 502. The instructions 510 stored in the memory 508 may include any suitable set of instructions, logic, rules, or code operable to execute the master controller 502. The rack information 514 includes information relating to the rack 100 including one or more of the rack number 422, rack UPC 424 and number of packs 426. In one embodiment, the rack information 514 or a portion thereof relating to the rack 100 is received from the rack 100. The planogram 512 may include a plan for product placement of a plurality of types of packs 202 in a plurality or racks 100 at a store. In one embodiment, the planogram includes a UPC 513 associated with a rack number 422 of each rack 100 indicating a type of the packs 202 to be stored in the rack 100.

The network interface 506 is configured to enable wired and/or wireless communications. The network interface 506 is configured to communicate data between the master controller 502 and other devices, systems, or domains (e.g. circuit board 120 of the rack 100, scanner 530 etc.). For example, the network interface 506 may comprise a Wi-Fi interface, a LAN interface, a WAN interface, a Bluetooth interface, a Zigbee interface, a modem, a switch, a router or any other interface using one or more communication protocols. The processor 504 is configured to send and receive data using the network interface 506. The network interface 506 may be configured to use any suitable type of communication protocol as would be appreciated by one of ordinary skill in the art.

In certain embodiments, the master controller 502 may be communicatively coupled to a plurality of racks 100 arranged across one or more shelves.

It may be noted that the scanner 530 may be implemented similar to the master controller 502 as shown in FIG. 5. For example, the scanner 530 may include a processor, a network interface and a memory storing instructions to implement the respective functionality when executed by the processor.

The scanner 530 may include a handheld scanner or any other type of scanner that can scan and interpret a code 142 (e.g. QR code). This disclosure may use the terms "scanner" and "handheld scanner" interchangeably. The scanner 530 may be configured to scan and decode several types of codes including, but not limited to, QR codes, bar codes, and UPCs.

The scanner 530 may include a code capturing sensor 536. The sensor 536 acquires information about a code 142 within a field of view of the sensor 536. The sensor 536 may include, but is not limited to, a laser scanner or an imaging scanner (e.g., optical reader). A laser scanner typically sweeps a laser from a laser source (e.g., laser diode) across its field of view. A photoreceptor (e.g., photodiode) acquires the laser light reflected from the code 142. The laser scanner converts the acquired, reflected laser light (e.g., optical signal) into an electrical signal that can be processed and decoded using signal processing techniques. An imaging scanner typically captures an image (e.g., frame) representing objects, including a code 142, within its field of view. The image module's image sensor converts light received through the imaging module's lens assembly into a digital image capable of being processed and decoded using image processing techniques. A person having ordinary skill in the art may appreciate that the scanner 530 may use other code capturing techniques. The scanner 530 may include a decoder (not shown) that is configured to decode information acquired by the sensor 536. In one embodiment, the scanner 530 may include a processor that is configured to decode the information acquired by the sensor 536 and a memory that stores decoded information.

The scanner 530 may include a trigger 538 (e.g., switch) that is configured to activate the sensor 536 and the decoder. To acquire code information relating to a code 142, the user actuates (e.g., depresses) the trigger 538 when the code 142 is brought within the field of view of the sensor 536. Typically, the scanner 530 continuously attempts to read and decode the code 142 as long as the trigger 538 is actuated. When the trigger 538 is released, however, the scanner 530 typically ceases its attempts to acquire code information (e.g., by entering standby mode).

The scanner 530 may additionally include a keypad 534 having a number of buttons with alphanumeric characters and some additional buttons such as "ENTER", "SELECT", "CLEAR" and "CANCEL" which, among other things, allow the user to enter a particular mode and/or switch between modes (e.g., product loading mode, product checking mode etc. as discussed below). The scanner 530 may also include a display screen 532 providing a visual interface for communicating with the user. As described above, a display device 140 associated with the rack 100 may display a code 142 that is associated with information relating to the rack 100 (e.g., stored in memory 406 of the rack 100) including, but not limited to, a rack number 422 of the rack, a UPC associated with a type of product (e.g., packs 202 of cigarettes) currently mapped to the rack 100 (e.g., rack UPC 424), and a number 426 of packs 202 (or an amount of any other product) currently stored in the rack 100. In one embodiment, when a user scans the code 142 using the scanner 530, the scanner 530 decodes the code 142 to extract at least a portion of the information relating to the rack 100 including, but not limited to, one or more of the rack number 422, the rack UPC 424 and the number 426 of the packs currently stored in the rack 100. In one embodiment, processor 404 may choose to associate with the code 142 only a portion of the information relating to the rack. Thus, scanning the code 142 using the scanner 530 provides the scanner 530 access to only that information which is currently associated with the code 142. In one example, the code 142 includes a QR code that points to a website or application that provides at least a portion of the rack information relating to the rack 100.

The scanner 530 may include a network interface (not shown) that allows the scanner 530 to communicate with the network interface 408 associated with the rack 100 and the network interface 506 associated with the master controller 502 using one or more communication protocols.

Associating a Rack 100 to a Type of a Product (e.g., Type of a Pack 202 of Cigarettes) to be Stored in the Rack 100 During Product Loading FIG. 6 is a flowchart of an example method 600 for associating a rack 100 with a type of a pack 202 of cigarettes to be stored in the rack 100, in accordance with certain embodiments of the present disclosure. Method 600 may be performed by the processor 404 on the circuit board 120 as shown and described above with reference to FIG. 4. It may be noted that the method 600 is described below with reference to FIGS. 4 and 5.

At operation 602, processor 404 receives (e.g., using network interface 408) an indication (e.g., first communication signal 542) that the scanner 530 has scanned the code 142 associated with the rack 100. As described above, a display device 140 positioned in the vicinity of the rack 100 may display the code 142 which is associated with information relating to the rack 100 (e.g., rack information 514). A user (e.g., store clerk) may use the scanner 530 to scan the code 142 from the display device 140. In one embodiment, the code 142 may include a unique rack address 428 associated with the rack (e.g., a network address of the network interface 408 on the circuit board 120 of the rack 100). The scanner 530 may obtain the rack address 428 upon decoding the code 142. After obtaining the rack address 428 of the rack 100, scanner 530 may transmit a first communication signal 542 to the rack address 428 of the rack 100. The first communication signal 542 is received by the network interface 408. The first communication signal 542 may serve as an indication that the scanner 530 has scanned the code 142 associated with the rack 100. In one embodiment, the first communication signal 542 includes a request to establish communication between the scanner 530 and the circuit board 120. Additionally or alternatively, the first communication signal 542 may include a request for the rack information associated with the code 142.

At operation 604, in response to receiving the indication (e.g., the first communication signal 542) from the scanner 530, processor 404 establishes communication with the scanner 530. For example, the processor 404 establishes a wireless communication link between the network interface 408 and the network interface of the scanner 530 using a wireless communication protocol (e.g., Bluetooth, Wi-Fi etc.).

At operation 606, processor 404 transmits (using the network interface 408) to the scanner 530 at least a portion of the rack information currently associated with the code 142. As described above, the processor 404 may associate with the code 142 at least a portion of the information relating to the rack 100. For example, the processor 404 may associate one or more of a rack number 422 of the rack, a UPC associated with a type of packs 202 currently mapped to the rack 100 (e.g., rack UPC 424), and a number 426 of packs 202 currently stored in the rack 100. After establishing a communication link with the scanner 530, the processor 404 may transmit at least a portion of the rack information that is associated with the code 142 displayed on the display device 140 and scanned by the scanner 530. For example, the processor 404 may transmit one or more of rack number 422 of the rack, the rack UPC 424, and the number 426 of packs 202 currently stored in the rack 100. The rack UPC 424 generally indicates a type of packs 202 currently stored in the rack 100. It may be noted that the rack 100 may or may not be mapped to a rack UPC 424. For example, a store clerk may not have previously mapped a UPC of a particular type of pack 202 to the rack 100. In one alternative embodiment, the processor 404 may skip operation 606 and directly jump to operation 608.

At operation 608, processor 404 may receive from the scanner a second UPC associated with a pack 202 of cigarettes scanned by the scanner 530 for loading into the rack 100. In certain embodiment, the scanner 530 may be switched to a product loading mode before or after scanning the code 142. After scanning the code 142 and establishing a communication link with the circuit board 120, and while the scanner 530 is in the product loading mode, the user (e.g., store clerk) may scan the second UPC of a pack 202 of cigarettes that is to be loaded in the rack 100. In response to scanning the second UPC of the pack 202, scanner 530 may transmit a second communication signal 544 to the circuit board 120. The second communication signal 544 may include the second UPC of the pack 202 scanned by the scanner 530. It may be noted that the second UPC may be different from the rack UPC 424 already mapped to the rack 100. In one embodiment, the second communication signal 544 may include an indication that the scanner 530 is in a product loading mode.

At operation 610, in response to receiving the second communication signal 544 including the second UPC of the pack 202 to be loaded in the rack 100, processor 404 maps the rack number 422 of the rack 100 to the second UPC received from the scanner 530.

At operation 612, processor 404 transforms the information currently relating to the rack 100 by updating the information relating to the rack stored in the memory 406. For example, when the memory 406 already stores a rack UPC 424 mapped to the rack 100, the processor 404 updates the rack UPC 424 store in memory 406 to the second UPC received from the scanner 530. Alternatively, when rack 100 is not currently mapped to a rack UPC 424, the processor 404 adds to the memory 406 the second UPC received from the scanner 530 as the rack UPC 424 mapped to the rack 100. Once the new rack UPC 424 has been mapped to the rack number 422 of the rack 100 and the rack information is updated with the newly mapped rack UPC 424, the user may load packs 202 of the same type (e.g., having the newly mapped rack UPC 424) in the rack 100.

It may be noted that since the code 142 is associated with the rack information stored in the memory 406 including the rack number 422, rack UPC 424 and the number 426 of packs 202 currently stored in the rack 100, the code 142 is always associated with the latest rack information. For example, once processor 404 updates the rack information (e.g., rack UPC 424) and stores the updated information (e.g., updated rack UPC 424 in the memory 406, the code 142 automatically associates with the updated rack information. Thus, once the rack information is updated, a subsequent scan of the code 142 causes the processor 404 to transmit the updated (e.g., most recent) rack information stored in the memory 406. For example after the rack information is updated at operation 612, the processor 404 may subsequently receive a second indication (e.g., communication signal 542) that the scanner 530 (e.g., another scanner) has scanned the code 142. In response, the processor 404 establish communication with the scanner 530 and transmit at least a portion of the updated rack information to the scanner 530.

In certain embodiments, processor 404 may be configured to detect that a pack 202 of cigarettes has been loaded in the rack 100, and in response, transform the information relating to the rack 100 by updating the number 426 of packs 202 stored in the rack 100. As described above with reference to FIGS. 1, 2A and 2B, the shoe 106 of the rack 100 is pushed back towards the rear end of the rack 100 with each pack 202 loaded on the rack 100. The processor 404 may be configured to detect when the shoe 106 moves along the length of the rack 100 from a previous position of the shoe 106 which may indicate that a pack 202 has been loaded in the rack 100. In response to detecting that the shoe 106 has moved from a previous position, the processor 404 may count a current number of packs 202 stored in the rack 100. The processor 404 may update the number 426 of the packs 202 stored in the rack 100 with the determined count of the packs 202 currently stored in the rack 100. A method of determining the number of packs 202 of cigarettes currently stored in the rack 100 is beyond the scope of this disclosure and will not be described herein.

In one embodiment, the processor 404 may be configured to transmit to the master controller 502 the updated information relating to the rack 100. For example, processor 404 may transmit updated rack information to the master controller 502 after a new rack UPC 424 is mapped to the rack number 422 of the rack 100 and/or in response to detecting that one or more packs 202 have been loaded in the rack 100. Master controller 502 may be configured to store in memory 508 rack information received from each rack 100 coupled to the master controller 502. For example, for each rack 100 coupled to the master controller 502, memory 508 may store the latest rack information 514 received from the rack 100 including the rack number 422 of the rack, the rack UPC 424 mapped to the rack number 422 and a number 426 of packs 202 stored in the rack 100.

Electronically mapping a rack 100 to a rack UPC 424 helps efficient and precise inventory tracking. For example, at any time, the master controller precisely knows which rack 100 is storing what product and in what amount. Thus, the disclosed system and method provide quick and precise information relating to product placement and amount of inventory relating to each product stored in racks 100. Accordingly, the disclosed system and method significantly improve the speed and accuracy of inventory tracking. Additionally, as the most recent information relating to a type and amount of product on each rack 100 is readily available, the disclosed system and method significantly improve the efficiency and accuracy of tracking planogram adherence. For example, a quick comparison of the rack information stored in the memory 502 of the master controller 502 with the planogram 512 may provide information relating to the particular racks 100 that are in non-conformance to the planogram 512. For example, the system may provide the rack number of a particular rack 100 that is currently storing the wrong product. Thus, the disclosed system and method significantly reduce the effort associated with tracking inventory and planogram adherence.

Checking a Rack 100 for Planogram Adherence

While the method 600 described above may greatly improve inventory tracking and planogram adherence, human errors during product loading may cause the wrong product to be loaded on to the racks 100. For example, while initially loading packs 202 of cigarettes on to a rack 100, a store clerk may associate the rack number 422 of the rack 100 with a UPC of a type of packs 202 that is in adherence with the predetermined planogram 512. For example, as described above, after scanning the code 142 associated to the rack 100, the store clerk may scan the UPC of a pack 202 that is in conformance to the product placement specified in the planogram 512 for that rack 100. However, after associating the correct UPC with the rack 100, the store clerk may actually load one or more packs 202 in the rack 100 that are of a different type than the type of packs whose UPC was mapped to the rack number 422 of the rack 100. Such an error may also take place when reloading the rack 100 with packs 202. In such a case, while the rack information 514 related to the rack 100 received and stored by the master controller 502 is in adherence to the planogram 512, the actual product (or a portion thereof) stored in the rack 100 is not in adherence to the planogram 512.

Figure 7:
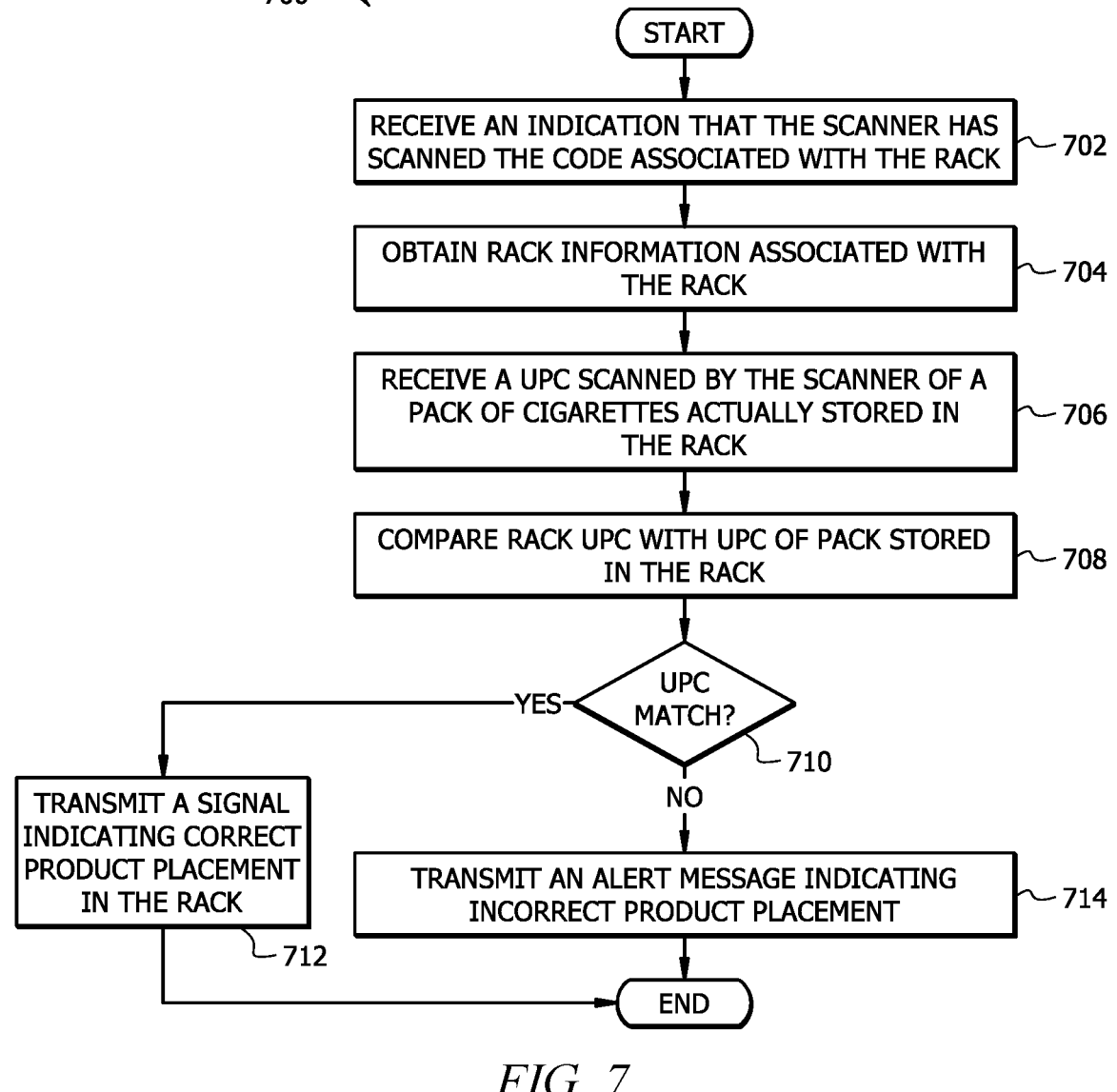
FIG. 7 is a flowchart of an example method for checking a rack for planogram adherence, in accordance with certain embodiments of the present disclosure.

FIG. 7 is a flowchart of an example method 700 for checking a rack 100 for planogram adherence, in accordance with certain embodiments of the present disclosure. Method 700 may be performed by the master controller 502 as shown and described above with reference to FIG. 5. It may be noted that the method 700 is described below with reference to FIGS. 4 and 5.

At operation 702, master controller 502 receives (e.g., using network interface 506) an indication that the scanner 530 has scanned the code 142 associated with the rack 100 while the scanner 530 is in a product checking mode. As described above, a display device 140 positioned in the vicinity of the rack 100 may display the code 142 which is associated with information relating to the rack 100. A user (e.g., store clerk) may use the scanner 530 to scan the code 142 from the display device 140. In one embodiment, the scanner 530 may transmit the scanned code 142 to the master controller 502 as part of a communication signal 546. The communication signal 546 may serve as an indication that the scanner 530 has scanned the code 142 associated with the rack 100. In one embodiment, the scanner 530 may be switched to the product checking mode before scanning the code 142. When the scanner 530 is used to scan the code 142 while the scanner 530 is in the product checking mode, the scanner 530 transmits the code 142 to the master controller 502. In an alternative or additional embodiment, in response to scanning the code 142, scanner 530 may receive the rack information 514 from the rack 100 as described with reference to FIG. 6. In response to receiving rack information from the rack 100, scanner 530 may transmit to the master controller 502 an indication that the scanner has scanned the code 142 associated with the rack 100. This indication may include the rack number 422 received from the rack 100 as part of the rack information. In another alternative or additional embodiment, the rack 100 may receive an indication that the scanner 530 has scanned the code 142 as described with reference to FIG. 6, and in response, the rack 100 may transmit an indication to the master controller 502 that the scanner 530 has scanned the code 142. This indication may include a rack number 422 of the rack 100.

At operation 704, in response to receiving the indication (e.g., from the scanner 530 or the rack 100), master controller obtains from the memory 508, rack information 514 associated with the rack 100 including a rack number 422 of the rack 100 and a rack UPC 424 mapped to the rack number 422. The rack UPC 424 indicates a type of packs 202 of cigarettes expected to be stored in the rack 100. For example, the rack UPC 424 may have been mapped to the rack number 422 of the rack 100 during initial product loading as described above with reference to FIG. 6. The rack UPC 424 may be in conformance to the product placement specified in the planogram 512 for that rack 100. As described above, the planogram 512 may include a plan for product placement of a plurality of types of packs 202 in a plurality or racks 100 at a store. In one embodiment, the planogram includes a UPC 513 associated with a rack number 422 of each rack indicating a type of the packs 202 to be stored in the rack 100. In one embodiment, upon receiving the indication that the scanner 530 has scanned the code 142 (e.g., from the scanner 530 or the rack 100), master controller 502 may retrieve from the memory 508, rack information 514 associated with the rack 100. As described above, the rack information 514 may have been previously received from the rack 100 and may include the rack number 422 of the rack 100 and the rack UPC 424 currently mapped to the rack number 422.

In an optional embodiment, master controller 502 transmits to the scanner 530, the rack information 514 associated with the rack 100 including the rack number 422 and the rack UPC 424. In an alternative embodiment, the master controller 502 does not transmit rack information 514 to the scanner 530. Instead, the scanner 530 receives the rack information from the circuit board 120 of the rack 100 as described with reference to FIG. 6.

At operation 706, master controller 502 receives from the scanner 530 a UPC scanned by the scanner 530 of a pack 202 of cigarettes actually stored in the rack 100. For example, after scanning the code 142 associated with the rack 100, the store clerk may remove a pack 202 from the rack 100 and scan the UPC of the pack 202 removed from the rack. The scanner 530 may transmit to the master controller 502, the UPC of the pack 202 removed from the rack 100 as part of another communication signal 548.

At operation 708, upon receiving the UPC of the pack 202 actually stored in the rack 100, master controller 502 compares the rack UPC 424 currently mapped to the rack number 422 of the rack 100 with the UPC received as part of communication signal 548 of the pack 202 actually stored in the rack 100.

At operation 710, master controller 502 checks whether the rack UPC 424 matches with the UPC of the pack 202 actually stored in the rack. If the rack UPC 424 matches with the UPC of the pack 202 actually stored in the rack, method 700 proceeds to operation 712 where master controller 502 transmits to the scanner 530 a communication signal 550 including a message indicating correct product placement in the rack 100. The message is an indication that the pack 202 scanned by the scanner 530 is of a correct type expected to be stored in the rack 100. Further, when the rack UPC 424 is in line with product placement for the rack 100 as specified by the planogram 512, the message further indicates that the pack 202 scanned by the scanner 530 is in line with the product placement for the rack 100 as specified by the planogram 512. In one embodiment, in response to receiving the indication of correct product placement in the rack 100, scanner 530 may be configured to display on the display 532 of the scanner 530, a visual indication informing the store clerk of the correct product placement of the scanned pack 202 in the rack 100. For example, the visual indication may include a green "check mark".

If the rack UPC 424 does not match with the UPC of the pack 202 actually stored in the rack, method 700 proceeds to operation 714 where the master controller 502 transmits to the scanner 530 a communication signal 552 including an alert message indicating incorrect product placement in rack 100. The alert message is an indication that the pack 202 scanned by the scanner 530 is not expected to be stored in the rack 100. Further, when the rack UPC 424 is not in line with product placement for the rack 100 as specified by the planogram 512, the alert message further indicates that the pack 202 scanned by the scanner 530 is not in line with the product placement for the rack 100 as specified by the planogram 512.

In one or more embodiments, master controller 502 may be configured to determine a confidence indicator 516 relating to a plurality of racks 100 in a store, wherein the confidence indicator 516 indicates a degree of adherence to the planogram 512. In one embodiment, the confidence indicator 516 is a numerical value (e.g., 0-100) or a percentage value (0%-100%). The master controller 502 may be configured to assign a higher value (e.g., higher numerical or percentage value) to the confidence indicator 516 for a higher number of racks 100 with correct product placements in conformance with the planogram 512. On the other hand, master controller 502 may be configured to assign a lower value (e.g., lower numerical or percentage value) to the confidence indicator 516 for a lower number of racks 100 with correct product placements in conformance with the planogram 512. For example, in response to determining (at operation 710) that the rack UPC 424 currently mapped to the rack 100 does not match with the UPC of the pack 202 actually stored in the rack 100 (indicating non-conformance to planogram 512), master controller 502 may update the confidence indicator 516 by lowering the value (e.g., numerical or percentage value) of the confidence indicator 516 by a pre-configured amount. On the other hand, in response to determining (at operation 712) that the rack UPC 424 currently mapped to the rack 100 matches with the UPC of the pack 202 actually stored in the rack 100 (indicating conformance to planogram 512), master controller 502 may update the confidence indicator 516 by raising the value (e.g., numerical or percentage value) of the confidence indicator 516 by a pre-configured amount. Thus, master controller 502 may be configured to update the confidence indicator 516 with each detected instance of conformance and non-conformance to the planogram 512. This assumes that the rack UPC 424 associated with the rack 100 is in sync with UPC 513 relating to the rack 100 as defined in the planogram 512. However, if this assumption is not true, the confidence indicator 516 relating to the rack 100 is determined by comparing the UPC 513 as defined for the rack 100 in the planogram 512 with the UPC of a pack 202 actually stored in the rack 100. For example, in response to determining that the UPC 513 specified for the rack 100 does not match with the UPC of a pack 202 actually stored in the rack 100 (indicating non-conformance to planogram 512), master controller 502 may update the confidence indicator 516 by lowering the value (e.g., numerical or percentage value) of the confidence indicator 516 by a pre-configured amount. On the other hand, in response to determining that the UPC 513 specified for the rack 100 matches with the UPC of a pack 202 actually stored in the rack 100 (indicating conformance to planogram 512), master controller 502 may update the confidence indicator 516 by raising the value (e.g., numerical or percentage value) of the confidence indicator 516 by a pre-configured amount.

In certain embodiments, master controller 502 may be configured to check for planogram adherence during product loading (e.g., when a rack UPC 424 of a pack 202 is not mapped to the rack number 422 of the rack 100). For example, as described with reference to FIG. 6, a store clerk may switch the scanner 530 to a product loading mode. Using the scanner 530 in the product loading mode, the store clerk may first scan the code 142 associated with the rack

100. In response to the scanner 530 scanning the code 142, master controller 502 receives an indication that the scanner 530 has scanned the code 142 associated with the rack 100. As described in operation 702, the master controller 502 may receive this indication from the scanner 530 and/or the rack 100. In response to receiving the indication that the scanner 530 has scanned the code 142 associated with rack 100, master controller 502 obtains from memory 508 a first UPC 513 of a type of pack 202 of cigarettes that is to be stored in the rack 100 according to the planogram 512. After scanning the code 142 associated with the rack 100, the store clerk may scan a second UPC of a pack 202 that the store clerk intends to map to the rack number 422 of the rack 100. The scanner 530 transmits the second UPC of the pack 202 to the master controller 502. Upon receiving the second UPC of the pack 202 scanned by the scanner 530, master controller 502 compares the first UPC 513 that is in conformance with the planogram 512 with the second UPC scanned by the scanner 530. If the first UPC 513 fails to match with the second UPC, master controller 502 transmits to the scanner 530 and alert message indicating that a wrong type of pack 202 has been selected for loading into the rack 100. This alert message may serve as a warning to the store clerk that the type of pack 202 selected for mapping to the rack number 422 of the rack 100 is not in conformance with the planogram 512.

Thus, the disclosed system and method provide quick and precise rack auditing. For example, a quick scan of the code 142 associated with a rack 100 provides information relating to the rack 100 almost instantly. This allows a user to quickly check whether a pack 202 actually stored in the rack 100 is of the type expected to be stored in the rack 100 as per the rack information associated with the code 142. Further, the disclosed system and method provide a technique for determining and tracking a degree of conformance of a store to a pre-determined planogram 512. As described in embodiments of this disclosure, the master controller 502 determines a confidence indicator 516 based checking product placement for a plurality of racks 100 in a store. The confidence indicator 516 allows an inventory planner to decide whether corrective measures need to be taken to improve planogram conformance. For example, when the confidence indicator 516 determined for a particular store is below a threshold value, the inventory planner may determine that additional training needs to be provided to the store clerks to improve planogram conformance. Additionally, by providing information relating to the correct type of pack 202 that is to be stored in a rack 100 while loading product, the disclosed system and method avoid human errors associated with product loading and thus improve planogram conformance.

Correcting Product Placement in a Rack in Conformance with Planogram

FIG. 8 is a flowchart of an example method 800 for correcting product placement in a rack 100 in conformance with a planogram 512, in accordance with certain embodiments of the present disclosure. Method 800 may be performed by the master controller 502 as shown and described above with reference to FIG. 5. It may be noted that the method 800 is described below with reference to FIGS. 4 and 5.

At operation 802, master controller 502 receives (e.g., using network interface 506) an indication that the scanner 530 has scanned the code 142 associated with the rack 100 while the scanner 530 is in a product checking mode. As described above, a display device 140 positioned in the vicinity of the rack 100 may display the code 142 which is associated with information relating to the rack 100. A user (e.g., store clerk) may use the scanner 530 to scan the code 142 from the display device 140. In one embodiment, the scanner 530 may transmit the scanned code 142 to the master controller 502 as part of a communication signal 546. The communication signal 546 may serve as an indication that the scanner 530 has scanned the code 142 associated with the rack 100. In one embodiment, the scanner 530 may be switched to the product checking mode before scanning the code 142. When the scanner 530 is used to scan the code 142 while the scanner 530 is in the product checking mode, the scanner 530 transmits the code 142 to the master controller. In an alternative or additional embodiment, in response to scanning the code 142, scanner 530 may receive the rack information 514 from the rack 100 as described with reference to FIG. 6. In response to receiving rack information from the rack 100, scanner 530 may transmit to the master controller 502 an indication that the scanner has scanned the code 142 associated with the rack 100. This indication may include the rack number 422 received from the rack 100 as part of the rack information. In another alternative or additional embodiment, the rack 100 may receive an indication that the scanner 530 has scanned the code 142 as described with reference to FIG. 6, and in response, the rack 100 may transmit an indication to the master controller 502 that the scanner 530 has scanned the code 142. This indication may include a rack number 422 of the rack 100.

At operation 804, in response to receiving the indication (e.g., from the scanner 530 or the rack 100) that the scanner 530 has scanned the code 142 associated with the rack 100, master controller 502 obtains from the memory 508, rack information 514 associated with the rack 100 including one or more of a rack number 422 of the rack 100, a rack UPC 424 currently mapped to the rack number 422, and a number 426 of packs 202 currently stored in the rack 100. The rack UPC 424 indicates a type of packs 202 of cigarettes expected to be stored in the rack 100. For example, the rack UPC 424 may have been mapped to the rack number 422 of the rack 100 during initial product loading as described above with reference to FIG. 6. As described above, the rack information 514 may have been previously received from the rack 100 and may include the rack number 422 of the rack 100 and the rack UPC 424 currently mapped to the rack number 422. Additionally or alternatively, in response to receiving the indication that the scanner 530 has scanned the code 142 associated with the rack 100, master controller 502 obtains from the memory 508, a UPC 513 associated with the rack number 422 of the rack 100 in accordance with the planogram 512. This UPC 513 is associated with a type of the packs 202 of cigarettes that are to be stored in the rack 100 based on the planogram 512. As described above, the planogram 512 may include a plan for product placement of a plurality of types of packs 202 in a plurality or racks 100 at a store. In one embodiment, the planogram includes a UPC 513 associated with a rack number 422 of each rack 100 indicating a type of the packs 202 to be stored in the rack 100.

In an optional embodiment, master controller 502 transmits to the scanner 530, the rack information 514 associated with the rack 100 (e.g., as stored in memory 508) including one or more of the rack number 422, the rack UPC 424 and the number 426 of the packs 202 stored in the rack 100. In an alternative embodiment, the master controller 502 does not transmit rack information 514 to the scanner 530. Instead, the scanner 530 receives the rack information from the circuit board 120 of the rack 100 as described with reference to FIG. 6. The scanner 530 may be configured to display at least a portion of the received rack information 514 on the display 532 of the scanner 530. For example, the scanner 530 may display the rack number 422 of the rack 100 informing the store clerk as to an identity of the particular rack 100 associated to the code 142 that was scanned by the scanner 530.

At operation 806, master controller 502 receives from the scanner 530 a UPC scanned by the scanner 530 of a pack 202 of cigarettes actually stored in the rack 100. For example, after scanning the code 142 associated with the rack 100, the store clerk may remove a pack 202 from the rack 100 and scan the UPC of the pack 202 removed from the rack. The scanner 530 may transmit to the master controller 502, the UPC of the pack 202 removed from the rack 100 as part of another communication signal 548.

At operation 808, upon receiving the UPC of the pack 202 actually stored in the rack 100, master controller 502 compares the UPC 513 associated with the rack number 422 of the rack 100 in accordance with the planogram 512 with the UPC received as part of communication signal 548 of the pack 202 actually stored in the rack 100.

At operation 810, master controller 502 checks whether the UPC 513 associated with the rack 100 according to the planogram 512 matches with the UPC of the pack 202 actually stored in the rack. If the UPC 513 associated with the rack 100 according to the planogram 512 matches with the UPC of the pack 202 actually stored in the rack, method 800 proceeds to operation 812 where master controller 502 transmits to the scanner 530 a communication signal 550 including a message indicating correct product placement in the rack 100. The message is an indication that the pack 202 scanned by the scanner 530 is of a correct type expected to be stored in the rack 100 in accordance with the product placement specified for the rack 100 by the planogram 512. In one embodiment, in response to receiving the indication of correct product placement in the rack 100, scanner 530 may be configured to display on the display 532 of the scanner 530, a visual indication informing the store clerk of the correct product placement of the scanned pack 202 in the rack 100. For example, the visual indication may include a green "check mark".

If the UPC 513 associated with the rack 100 according to the planogram 512 does not match with the UPC of the pack 202 actually stored in the rack, method 800 proceeds to operation 814 where the master controller 502 transmits to the scanner 530 a communication signal 552 including an alert message indicating incorrect product placement in rack 100. The alert message is an indication that the pack 202 scanned by the scanner 530 is not a type of pack 202 that is expected to be stored in the rack 100 in accordance with the product placement specified for the rack 100 by the planogram 512. The communication signal 552 may further include information relating to the type of packs 202 associated with the UPC 513 that is mapped in the planogram 512 to the rack number 422 of the rack 100. For example, the communication signal 552 may include a picture of the type of packs 202 of cigarettes that are expected to be stored in the rack 100 according to the product placement of the rack 100 specified by the planogram 512. The scanner 530 may be configured to display the picture of the pack 202 received from the master controller 502 in the display 532 of the scanner 530 to help the store clerk identify the correct type of packs 202 that are to be stored in the rack 100.

In certain embodiments, in response to determining that rack 100 stored a wrong type of packs 202 in the rack 100, the master controller 502 may obtain from the memory 508, a correct product placement for the type of pack actually stored in the rack 100 according to the planogram 512. For example, master controller 502 searches the planogram 512 for one or more racks 100 that can store the type of pack 202 associated with the UPC received in communication signal 548 of a pack 202 of cigarettes actually stored in the rack 100. The UPC of the pack 202 actually stored in the rack 100 may be mapped to one or more rack numbers 422. Thus, based on searching the planogram 512, master controller 502 may obtain one or more rack numbers 422 that are mapped to the UPC of the pack 202 actually stored in the rack 100. Master controller 502 may be configured to transmit to the scanner 530 one or more of the rack numbers 422 obtained as a result of searching the planogram 512. In one embodiment, the master controller 502 obtains from the memory 508, a number 426 of packs 202 stored in each of the racks 100 associated with rack numbers 422 mapped to the UPC of the pack 202 actually stored in the rack 100. The master controller 502 may transmit to the scanner 530 a rack number 422 of a corresponding rack 100 that stores the least number 426 of packs. Upon receiving the rack number 422 from the master controller 502, scanner 530 may be configured to display the received rack number 422 in the display 532 of the scanner 530 to aid the store clerk in moving the pack 202 wrongly stored in rack 100 to a correct rack 100.

In certain embodiments, master controller 502 may be configured to facilitate planogram conformance during product loading in the rack 100. For example, as described with reference to FIG. 6, a store clerk may switch the scanner 530 to a product loading mode. Using the scanner 530 in the product loading mode, the store clerk may first scan the code 142 associated with the rack 100. In response to the scanner 530 scanning the code 142, master controller 502 receives an indication that the scanner 530 has scanned the code 142 associated with the rack 100 in the product loading mode. As described in operation 802, the master controller 502 may receive this indication from the scanner 530 and/or the rack 100. In response to receiving the indication that the scanner 530 has scanned the code 142 associated with rack 100, master controller 502 obtains from memory 508 a UPC 513 of a type of packs 202 of cigarettes that is to be stored in the rack 100 according to the planogram 512. In response to receiving the indication that the scanner 530 has scanned the code 142 associated with the rack 100 while the scanner 530 is in the product loading mode, the master controller 502 may be configured to transmit to the scanner 530 a communication signal (e.g., communication signal 552) including information relating to the type of packs 202 associated with the UPC 513 that is mapped in the planogram 512 to the rack number 422 of the rack 100. For example, the communication signal 552 may include a picture of the type of packs 202 of cigarettes that are expected to be stored in the rack 100 according to the product placement of the rack 100 specified by the planogram 512. The scanner 530 may be configured to display the picture of the pack 202 received from the master controller 502 in the display 532 of the scanner 530 to help the store clerk identify the correct type of packs 202 for loading in the rack 100.

By intelligently detecting wrong product placement on racks 100 during product checking and product loading, and in response, providing information relating to correct product placement in the racks 100 that is in line with product placement specified by the planogram 512, the disclosed system and method allow efficient correction of product placement and improve planogram conformance.

Figure 9:
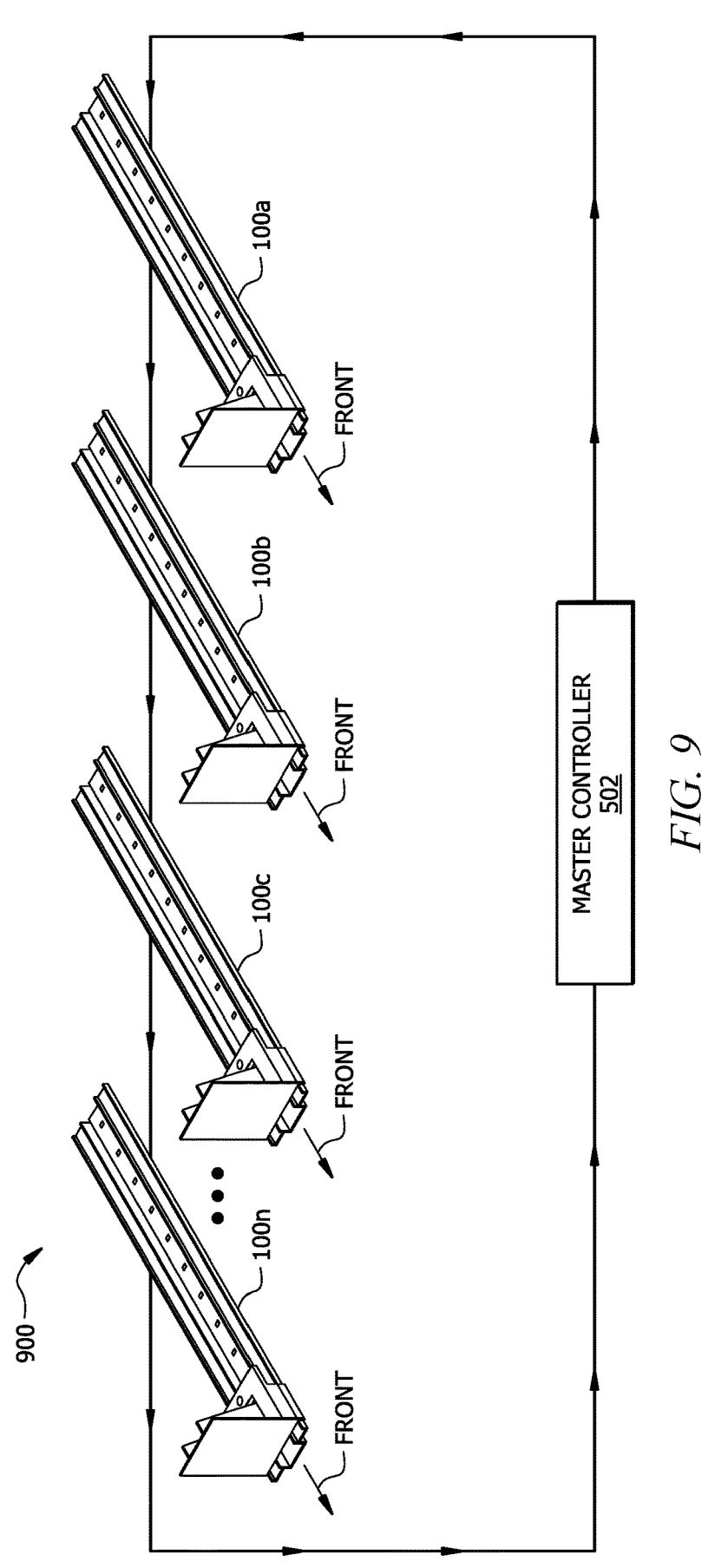
FIG. 9 illustrates an example network topology for connecting a plurality of racks shown in FIG. 1 to a master controller, in accordance with certain embodiments of the present disclosure.

FIG. 9 illustrates an example network topology 900 for connecting a plurality of racks 100 shown in FIG. 1 to a master controller, in accordance with certain embodiments of the present disclosure.

A typical store has several racks 100 arranged in one or more shelves. Network topology 900 is an example network arrangement of a plurality of racks 100 that are in communication with a master controller 502. As shown in FIG. 9, network topology 900 includes a plurality or racks 100 (shown as 100a, 100b, 100c . . . 100n) and a master controller 502 connected in a daisy chain. Each rack 100 includes an inbound connector (e.g., one or more input pins on the circuit board 120) and an outbound connector (e.g., one or more output pins on the circuit board 120). The inbound connector may be used to receive data from other devices (e.g., other racks 100 or master controller 502) and the outbound connector may be used to transmit data to other devices (e.g., other racks 100 or master controller 502). Each rack 100 may use a respective network interface 408 to receive and transmit data. For example, data received at the inbound connector may be routed to the network interface 408. Further, the network interface 408 may transmit data via the outbound connector.

As shown in FIG. 9, master controller 502 is connected to the inbound connector of the first rack 100a. The first rack 100a is then connected through its outbound connector to the inbound connector of the second rack 100b. This connection sequence is repeated until all racks 100a-n are connected, with the last racks 100n outbound connector connected back to the master controller 502, forming a ring topology. As shown, data in the daisy chain flows in one direction, from the master controller 502 to the first rack 100a, from one rack to the next rack in series, and then back to the master controller 502 from the last rack 100n in the daisy chain.

Each rack 100 stores an address in a respective memory 406. The address of a particular rack 100 is what the master controller 502 uses to issue commands to the particular rack 100 and to interpret and associate data coming from the particular rack 100. Addresses may be simple sequence numbers and are initially undefined. At system startup (e.g., a cold start or a reset of the master controller 502) the master controller 502 passes a "Clear Address" command to the first rack 100a instructing the rack 100a to clear its address. The first rack 100a clears its address and then transmits/forwards the same command to the second rack 100b. This continues to the end of the daisy chain until the last rack 100n sends the "Clear Address" command back to the master controller 502, which indicates to the master controller 502 that all racks have cleared their addresses.

After clearing all of the addresses of all racks 100, the master controller 502 begins a sequence that results in the assignment of addresses to all racks 100 in the network. This begins with a "Set Address" command with an address value of 0x0001 (hexadecimal) passed by the master controller 502 to the first rack 100a. Upon receiving this command, the first rack 100a sets its address to 0x0001, increments that value by one and passes the "Set Address" command and the new value to the second rack 100b. The second rack 100b sets its own address, increments the value and passes the command to the third rack 100c. This continues down the chain until the last rack 100n sets its address, increments the value and passes the "Set Address" command back to the master controller. When the master controller 502 sees this command and address returned to it, it now has a count of the number of racks it is attached to (e.g., the finally received address value minus one). In practice, as long as no racks 100 are added, removed, reconfigured (e.g., moved) or experience failure, racks 100 always have the same address between resets, power cycles, etc.

Once all racks 100 have chosen an address, the master controller 502 may command any one rack for rack information 514 associated with the rack 100. For example, the master controller 502 may transmit a "Get Current Count" command along with the address of the rack 100. The command is passed down the chain until a target rack with the matching address included in the command receives the command. The target rack transmits a "Current Count" response to the next rack in the chain, wherein the response includes the latest count of packs 202 stored in the target rack and the address of the target rack. The response is passed down the chain to the master controller 502 which interprets the response as received from the target rack from the address included in the response. In some embodiments, as discussed above, a rack 100 in the chain may transmit an unsolicited message to the master controller 902 including rack information 514 or other signaling. An unsolicited message transmitted by a particular rack 100 may include an address of the rack allowing the master controller 902 to identify the particular rack 100 that transmitted the unsolicited message.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a plurality of racks, wherein each rack stores a plurality of packs of cigarettes;

a plurality of display devices, wherein each display device is associated with a corresponding rack of the plurality of racks and is positioned in front of the corresponding rack; and a scanner comprising a trigger, wherein the trigger activates the scanner;

wherein the scanner is configured to: upon a first activation by the trigger, scan a first code displayed by a first display device associated with a first rack of the plurality of racks while the scanner is in a product checking mode;

transmit an indication to a master controller that the scanner has scanned the first code associated with the first rack;

upon a second activation by the trigger after the first activation, scan a second UPC, wherein the second UPC is associated with a pack of cigarettes actually stored in the first rack; and transmit the second UPC to the master controller;

the master controller is communicatively coupled to the plurality of racks and the plurality of display devices, wherein the master controller comprises:

a network interface;

a memory that stores:

a planogram that comprises a plan for product placement of a plurality of types of the packs in the plurality of racks, wherein the planogram comprises a universal product code (UPC) associated with a rack number of each rack indicating a type of the packs to be stored in the rack;

information relating to each rack, wherein the information comprises at least the rack number of the rack; and for each rack, a code associated with the information relating to the rack, wherein the display device associated with each rack displays the code associated with the information relating to the rack;

wherein:

the first rack comprises a longitudinal track with a shoe movably attached to the longitudinal track such that the shoe travels back and forth on the track between a front end and rear end of the first rack;

the shoe is positioned at the front end of the rack when no packs of cigarettes are stored in the first rack; and as each pack of cigarette is loaded on to the first rack, the shoe is pushed back on the track along the length of the first rack towards the rear end of the rack; and a processor communicatively coupled to the network interface and the memory, wherein the processor is configured to:

receive using the network interface the first indication that the scanner has scanned the first code displayed by the first display device associated with the first rack of the plurality of racks while the scanner is in the product checking mode;

in response to receiving the first indication, obtain from the memory:

a first rack number of the first rack; and a first UPC associated with the first rack number based on the planogram, wherein the first UPC is associated with the type of the packs to be stored in the first rack based on the planogram;

after receiving the first indication, receive using the network interface from the scanner the second UPC scanned by the scanner, wherein the second UPC is associated with the pack of cigarettes actually stored in the first rack;

compare the first UPC with the second UPC;

determine based on the comparison that the second UPC does not match with the first UPC thereby indicating that a wrong type of pack of cigarettes is actually stored in the first rack;

transmit an alert message to the scanner, wherein the alert message indicates incorrect product placement in the first rack and comprises information relating to the type of the packs associated with the first UPC to be stored in the first rack based on the planogram;

in response to determining that the wrong type of pack of cigarettes is actually stored in the first rack, determine, based on the planogram, a second rack number of a second rack associated with the second UPC of the pack of cigarettes actually stored in the first rack, wherein the second rack is configured to store packs of cigarettes associated with the second UPC in accordance with the planogram;

transmit the second rack number of the second rack for display on a display of the scanner to cause the pack of cigarettes associated with the second UPC that is actually stored in the rack to be moved for storage in the second rack;

detect that the shoe has moved along the length of the rack from a previous position of the shoe towards the rear end of the first rack, wherein movement of the shoe from the previous position indicates that a pack of cigarette is loaded in the first rack;

in response to detecting that the shoe has moved from the previous position, count a current number of packs of cigarettes stored in the rack; and update a number of the packs of cigarettes stored in first rack to reflect the current number of the packs, wherein the first rack comprises a circuit board and the number of packs is stored in a memory associated with a circuit board.

2. The system of claim 1, wherein the processor is further configured to:

receive using the network interface a second indication that the scanner has scanned a second code associated with a second rack when the scanner is in a product loading mode;

in response to receiving the second indication, obtain from the memory:

a second rack number of the second rack; and a third UPC associated with the second rack number based on the planogram, wherein the third UPC is associated with a second type of the packs to be stored in the second rack based on the planogram; and transmit to the scanner the second rack number and information relating to the second type of the packs to be stored in the second rack based on the planogram.

3. The system of claim 1, wherein the information relating to the type of the packs associated with the first UPC to be stored in the first rack comprises a picture of a pack of cigarettes of the type associated with the first UPC.

4. The system of claim 1, wherein the processor is further configured to transmit to the scanner the first rack number for display on a display of the scanner.

5. The system of claim 1, wherein:

the information relating to each rack further comprises a number of packs stored in the rack and a UPC associated with a type of the packs expected to be stored in the rack, wherein the type of the packs expected to be stored in the rack is based on the information collected while the rack was loaded with the packs; and the processor is further configured to transmit to the scanner the number of packs stored in the rack and the UPC associated with a type of the packs expected to be stored in the rack.

6. The system of claim 1, wherein the code comprises a quick response (QR) code.

7. The system of claim 1, wherein the scanner comprises a handheld scanner.

8. A system, comprising:

a plurality of racks, wherein each rack stores a plurality of items;

a plurality of display devices, wherein each display device is associated with a corresponding rack of the plurality of racks and is positioned in front of the corresponding rack; and a scanner comprising a trigger, wherein the trigger activates the scanner;

wherein the scanner is configured to:

upon a first activation by the trigger, scan a first code displayed by a first display device associated with a first rack of the plurality of racks while the scanner is in a product checking mode;

transmit an indication to a master controller that the scanner has scanned the first code associated with the first rack;

upon a second activation by the trigger after the first activation, scan a second UPC, wherein the second UPC is associated with an item actually stored in the first rack; and transmit the second UPC to the master controller;

the master controller is communicatively coupled to the plurality of racks and the plurality of display devices, wherein the master controller comprises:

a network interface;

a memory that stores:

a planogram that comprises a plan for product placement of a plurality of types of the items in the plurality of racks, wherein the planogram comprises a universal product code (UPC) associated with a rack number of each rack indicating a type of the items to be stored in the rack;

information relating to each rack, wherein the information comprises at least the rack number of the rack; and for each rack, a code associated with the information relating to the rack, wherein the display device associated with each rack displays the code associated with the information relating to the rack;

wherein:

the first rack comprises a longitudinal track with a shoe movably attached to the longitudinal track such that the shoe travels back and forth on the track between a front end and rear end of the first rack;

the shoe is positioned at the front end of the rack when no items are stored in the first rack; and as each item is loaded on to the first rack, the shoe is pushed back on the track along the length of the first rack towards the rear end of the rack; and a processor communicatively coupled to the network interface and the memory, wherein the processor is configured to:

receive using the network interface the first indication that the scanner has scanned the first code displayed by the first display device associated with the first rack of the plurality of racks while the scanner is in the product checking mode;

in response to receiving the first indication, obtain from the memory:

a first rack number of the first rack; and a first UPC associated with the first rack number based on the planogram, wherein the first UPC is associated with the type of the items to be stored in the first rack based on the planogram;

after receiving the first indication, receive using the network interface from the scanner the second UPC scanned by the scanner, wherein the second UPC is associated with the item actually stored in the first rack;

compare the first UPC with the second UPC;

determine based on the comparison that the second UPC does not match with the first UPC thereby indicating that a wrong type of item is actually stored in the first rack;

transmit an alert message to the scanner, wherein the alert message indicates incorrect product placement in the first rack and comprises information relating to the type of the items associated with the first UPC to be stored in the first rack based on the planogram in response to determining that the wrong type of item is actually stored in the first rack, determine, based on the planogram, a second rack number of a second rack associated with the second UPC of the item actually stored in the first rack, wherein the second rack is configured to store items associated with the second UPC in accordance with the planogram;

transmit the second rack number of the second rack for display on a display of the scanner to cause the item associated with the second UPC that is actually stored in the rack to be moved for storage in the second rack;

detect that the shoe has moved along the length of the rack from a previous position of the shoe towards the rear end of the first rack, wherein movement of the shoe from the previous position indicates that an is loaded in the first rack;

in response to detecting that the shoe has moved from the previous position, count a current number of items stored in the rack; and update a number of the items stored in first rack to reflect the current number of the items, wherein the first rack comprises a circuit board and the number of items is stored in a memory associated with a circuit board.

9. The system of claim 8, wherein the processor is further configured to:

receive using the network interface a second indication that the scanner has scanned a second code associated with a second rack when the scanner is in a product loading mode;

in response to receiving the second indication, obtain from the memory:

a second rack number of the second rack; and a third UPC associated with the second rack number based on the planogram, wherein the third UPC is associated with a second type of the items to be stored in the second rack based on the planogram; and transmit to the scanner the second rack number and information relating to the second type of the items to be stored in the second rack based on the planogram.

10. The system of claim 8, wherein the information relating to the type of the items associated with the first UPC to be stored in the first rack comprises a picture of an item of the type associated with the first UPC.

11. The system of claim 8, wherein the processor is further configured to transmit to the scanner the first rack number for display on a display of the scanner.

12. The system of claim 8, wherein:

the information relating to each rack further comprises a number of items stored in the rack and a UPC associated with a type of the items expected to be stored in the rack, wherein the type of the items expected to be stored in the rack is based on the information collected while the rack was loaded with the items; and the processor is further configured to transmit to the scanner the number of items stored in the rack and the UPC associated with a type of the items expected to be stored in the rack.

13. A method for correcting product placement in a rack, comprising:

receiving using a network interface a first indication that a scanner has scanned a first code associated with a first rack of a plurality of racks while the scanner is in a product checking mode, wherein:

the scanner comprises a trigger, wherein the trigger activates the scanner;

wherein the scanner is configured to:

upon a first activation by the trigger, scan the first code displayed by a first display device associated with the first rack of the plurality of racks while the scanner is in the product checking mode;

transmit an indication that the scanner has scanned the first code associated with the first rack;

each rack stores a plurality of packs of cigarettes;

for each rack, a code is displayed by a display device associated with the rack and positioned in front of the rack;

for each rack, the code associated with the rack is associated with information relating to the rack; and for each rack, the information relating to the rack comprises at least a rack number of the rack;

wherein:

the first rack comprises a longitudinal track with a shoe movably attached to the longitudinal track such that the shoe travels back and forth on the track between a front end and rear end of the first rack;

the shoe is positioned at the front end of the rack when no packs of cigarettes are stored in the first rack; and as each pack of cigarette is loaded on to the first rack, the shoe is pushed back on the track along the length of the first rack towards the rear end of the rack;

in response to receiving the first indication, obtaining:

a first rack number of the first rack; and a first universal product code (UPC) associated with the first rack number based on a planogram, wherein the first UPC is associated with the type of the packs to be stored in the first rack based on the planogram, wherein the planogram comprises a plan for product placement of a plurality of types of the packs in the plurality of racks, wherein the planogram comprises the UPC associated with a rack number of each rack indicating a type of the packs to be stored in the rack;

after receiving the first indication, receiving using the network interface from the scanner a second UPC scanned by the scanner, wherein the second UPC is associated with a pack of cigarettes actually stored in the first rack, wherein the scanner is further configured to:

upon a second activation by the trigger after the first activation, scan the second UPC associated with the pack of cigarettes actually stored in the first rack; and transmit the second UPC;

comparing the first UPC with the second UPC;

determining based on the comparison that the second UPC does not match with the first UPC; and transmitting an alert message to the scanner, wherein the alert message indicates incorrect product placement in the first rack and comprises information relating to the type of the packs associated with the first UPC to be stored in the first rack based on the planogram;

in response to determining that the wrong type of pack of cigarettes is actually stored in the first rack, determining, based on the planogram, a second rack number of a second rack associated with the second UPC of the pack of cigarettes actually stored in the first rack, wherein the second rack is configured to store packs of cigarettes associated with the second UPC in accordance with the planogram;

transmitting the second rack number of the second rack for display on a display of the scanner to cause the pack of cigarettes associated with the second UPC that is actually stored in the rack to be moved for storage in the second rack;

detecting that the shoe has moved along the length of the rack from a previous position of the shoe towards the rear end of the first rack, wherein movement of the shoe from the previous position indicates that a pack of cigarette is loaded in the first rack;

in response to detecting that the shoe has moved from the previous position, counting a current number of packs of cigarettes stored in the rack; and updating a number of the packs of cigarettes stored in first rack to reflect the current number of the packs, wherein the first rack comprises a circuit board and the number of packs is stored in a memory associated with a circuit board.

14. The method of claim 13, further comprising:

receiving using the network interface a second indication that the scanner has scanned a second code associated with a second rack when the scanner is in a product loading mode;

in response to receiving the second indication, obtaining:

a second rack number of the second rack; and a third UPC associated with the second rack number based on the planogram, wherein the third UPC is associated with a second type of the packs to be stored in the second rack based on the planogram; and transmitting to the scanner the second rack number and information relating to the second type of the packs to be stored in the second rack based on the planogram.

15. The method of claim 13, wherein the information relating to the type of the packs associated with the first UPC to be stored in the first rack comprises a picture of a pack of cigarettes of the type associated with the first UPC.

16. The method of claim 13, wherein further comprising transmitting to the scanner the first rack number for display on a display of the scanner.

17. The method of claim 13, wherein:

the information relating to each rack further comprises a number of packs stored in the rack and a UPC associated with a type of the packs expected to be stored in the rack, wherein the type of the packs expected to be stored in the rack is based on the information collected while the rack was loaded with the packs; and further comprising transmitting to the scanner the number of packs stored in the rack and the UPC associated with a type of the packs expected to be stored in the rack.

* * * * *